US008867133B2

(12) United States Patent
Seo et al.

(10) Patent No.: US 8,867,133 B2
(45) Date of Patent: Oct. 21, 2014

(54) POLARIZATION CONVERTING DEVICE AND METHOD FOR MANUFACTURING THE SAME

(75) Inventors: Eunsung Seo, Seoul (KR); Seungman Jeong, Seoul (KR); Hyunho Choi, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 478 days.

(21) Appl. No.: 12/830,943

(22) Filed: Jul. 6, 2010

(65) Prior Publication Data
US 2011/0002039 A1 Jan. 6, 2011

(30) Foreign Application Priority Data

Jul. 6, 2009 (KR) .................. 10-2009-0061385
Jul. 6, 2009 (KR) .................. 10-2009-0061390
Jul. 6, 2009 (KR) .................. 10-2009-0061391
Jul. 6, 2009 (KR) .................. 10-2009-0061392

(51) Int. Cl.
*G02B 27/28* (2006.01)
*H04N 9/31* (2006.01)
*G02B 5/30* (2006.01)

(52) U.S. Cl.
CPC ............ *G02B 27/285* (2013.01); *G02B 5/3083* (2013.01); *H04N 9/3167* (2013.01)
USPC .................... 359/489.08; 359/489.07; 349/96; 349/123

(58) Field of Classification Search
None
See application file for complete search history.

(56) References Cited

U.S. PATENT DOCUMENTS 6,404,550 B1 * 6/2002 Yajima ..................... 359/485.04

7,622,166 B2 * 11/2009 Ishizaki et al. ............... 428/1.23
2004/0263974 A1 12/2004 McDonough et al.
2007/0046897 A1 * 3/2007 Hwang et al. .................. 353/20

FOREIGN PATENT DOCUMENTS

| JP | 2001-337226 A | 12/2001 |
| JP | 2005-157378 A | 6/2005 |
| JP | 2006-276397 A | 10/2006 |
| KR | 10-2003-0016812 A | 3/2003 |

OTHER PUBLICATIONS

Office Action dated Jan. 31, 2012 in Chinese Application No. 201010220001.9, filed Jul. 6, 2010.
Office Action dated Mar. 23, 2011 in Korean Application No. 10-2009-0061392, filed Jul. 6, 2009.
Office Action dated Mar. 28, 2011 in Korean Application No. 10-2009-0061391, filed Jul. 6, 2009.
Office Action dated Mar. 28, 2011 in Korean Application No. 10-2009-0061385, filed Jul. 6, 2009.
Office Action dated Mar. 28, 2011 in Korean Application No. 10-2009-0061390, filed Jul. 6, 2009.

* cited by examiner

*Primary Examiner* — Derek S Chapel
(74) *Attorney, Agent, or Firm* — Saliwanchik, Lloyd & Eisenschenk

(57) ABSTRACT

The present disclosure relates to a polarization converting device and a method for manufacturing the same, wherein the polarization converting device includes a polarization separation unit aligned with a plurality of unit blocks including an optical separator transmitting a first polarization between an upper surface and a lower surface and reflecting a second polarization, and a phase retarder aligned in correspondence to an upper surface of each unit block of the polarization separation unit where a first region and a second region are alternately formed, wherein any one of the first and second regions of the phase retarder converts the polarized light while the other region emits the polarized light as it is.

7 Claims, 22 Drawing Sheets

POLARIZATION CONVERTING DEVICE AND METHOD FOR MANUFACTURING THE SAME

CROSS-REFERENCE TO RELATED APPLICATIONS

This application claims the benefit under 35 U.S.C. §119 of Korean Patent Applications Nos. 10-2009-0061385, 10-2009-0061390, 10-2009-0061391 and 10-2009-0061392, filed on Jul. 6, 2009, which are hereby incorporated by reference in their entirety.

BACKGROUND OF THE DISCLOSURE

Field of the Invention

The present disclosure relates to a polarization converting device and a method for manufacturing the same.

An absorbing polarizer assembled across a liquid crystal layer of liquid crystal display (LCD) panel basically absorbs 50% of incident non-polarized light, such that active researches are recently being waged to increase an optical efficiency by replacing the absorbing polarizer or converting most of the light incident on the polarizer to polarizing light parallel with a transmission axis of the polarizer.

One of the research attempts is to separate incident non-polarization beam to two orthogonal linear polarization beams using a PBS (Polarizing Beam Splitter), and to selectively mount a phase plate on one linear polarization path to rotate the polarization by 90 degrees, thereby converting all the polarized beams incident on the LCD panel to a particular state of linear polarization beam, whereby optical absorption at the absorbing polarizer is removed to increase the optical use efficiency.

As noted above, a device mounted with a PBS and a phase plate for converting polarization of all beams to a linear polarization in a particular state is called a polarization converting device.

However, as illustrated in FIG. 1, the conventional polarization converting device suffers from poor polarization converting efficiency due to an erroneous alignment generated between a pitch 12 and a phase plate 13 of a PBS array 11 because the phase plate 13 must be attached in correspondence to the pitch of the PBS array 11 through a separate process. The phase plate attaching method creates lots of problems as miniaturization of the polarization converting device is required concomitant with the advancement of technology.

An edge effect is further highlighted as a result of thickness of the phase plate caused by the miniaturization of the polarization converting device, and a problem arises as light passing through an edge fails to be correctly polarization-converted.

As one of the measures to overcome the disadvantages in the conventional polarization converting device, inventors to the present disclosure have successfully performed many experiments and researches to prevent an erroneous alignment of a phase plate at a polarization converting device useable in a small-sized projector and to reduce the edge effect caused by thickness of the phase plate.

BRIEF SUMMARY

In a first exemplary embodiment of the present disclosure, there is provided a polarization converting device and method for manufacturing the same configured to alternately form an optical axis-different phase retarder to reduce an optical loss caused by erroneous alignment, and to greatly improve a polarization converting efficiency and optical use efficiency using a simple manufacturing process.

In the first exemplary embodiment of the present disclosure, the polarization converting device comprises: a polarization separation unit aligned with a plurality of unit blocks including an optical separator transmitting a first polarization between an upper surface and a lower surface and reflecting a second polarization; and a phase retarder aligned in correspondence to an upper surface of each unit block of the polarization separation unit where a first region and a second region are alternately formed, wherein any one of the first and second regions of the phase retarder converts the polarized light while the other region emits the polarized light as it is.

In the first exemplary embodiment, the first region is formed with an optical axis horizontal with or vertical to the first polarization while the second region is formed with an optical axis inclined at 45 degrees relative to the first region.

In the first exemplary embodiment, a method for manufacturing the polarization converting device is provided, the method comprising: preparing a polarization separation unit aligned with a plurality of unit blocks including an optical separator bisecting light responsive to polarization direction; coating an optical alignment film on the substrate; irradiating ultraviolet (UV) on the optical alignment film to a reference direction; irradiating UV on the optical alignment film aligned to the reference direction along a mask pattern alternately formed with a transmissive region and a non-transmissive region partially inclined at 45 degrees to the reference direction; coating and curing a reactive liquid crystal on the optical alignment film.

According to the abovementioned configuration, the polarization converting device according to the present disclosure can be easily manufactured in a simple process to free itself from limitation resultant from miniaturization and to prevent light loss in the vicinity of corners.

In a second exemplary embodiment of the present disclosure, there is provided a polarization converting device and method for manufacturing the same configured to continuously form an optical-axis different phase retarder on a substrate, to attach to a polarization separation unit and to reduce an optical loss caused by erroneous alignment, whereby polarization converting efficiency and optical use efficiency can be greatly improved using a simple manufacturing process.

In the second exemplary embodiment of the present disclosure, there is provided a polarization converting device, the device comprising: a polarization separation unit aligned with a plurality of unit blocks including an optical separator transmitting a first polarization and reflecting a second polarization; and a phase retarder formed thereon with a substrate and alternately arranged with a first region and a second region aligned in correspondence to each unit block of the polarization separation unit.

In the second exemplary embodiment, the first region is formed with an optical axis direction horizontal with or vertical to the first polarization while the second region is formed with an optical axis direction inclined at 45 degrees from the first region.

In the second exemplary embodiment, a method for manufacturing the polarization converting device is provided, the method comprising: coating an optical alignment film on the polarization separation unit; irradiating ultraviolet (UV) on the optical alignment film to a reference direction; irradiating UV on the optical alignment film aligned to the reference direction along a mask pattern alternately formed with a transmitting region and a blocking region partially inclined at 45 degrees to the reference direction; coating and curing a reactive liquid crystal on the optical alignment film to form a phase retardant layer alternately formed with optical axis-different first region and second region; and aligning and attaching the first and second regions of the phase retardant layer to the unit block of the polarization separation unit.

According to the abovementioned configuration, the polarization converting device according to the present disclosure can be easily manufactured in a simple process to free itself from limitation resultant from miniaturization and to prevent light loss in the vicinity of corners.

Furthermore, there is an advantage in that an attachment position of the phase retardation element can be diversified according to desired polarization types because the phase retardation element is formed on the substrate and attached to the PBS.

In a third exemplary embodiment of the present disclosure, there is provided a phase retardant plate, a polarization converting device including the phase retardant plate and method for manufacturing the same configured to continuously form an optical-axis different phase retardant plate to reduce an optical loss caused by erroneous alignment, whereby polarization converting efficiency and optical use efficiency can be greatly improved using a simple manufacturing process.

In the third exemplary embodiment of the present disclosure, a polarization converting device is provided, the device comprising: a substrate; a first quarter wave converting layer formed at one side of the substrate and alternately formed with a first region having an optical axis in a first direction and a second region having an optical axis perpendicular to the optical axis of the first region; and a second quarter wave converting layer formed at the other side of the substrate and having an optical axis identical to any one optical axis of the first region or the second region.

The polarization converting device may further include a polarization separation unit coupled to the first quarter wave converting layer and arranged with a plurality of unit blocks including an optical separator bisecting light responsive to polarization direction.

In the third exemplary embodiment, a method for manufacturing the polarization converting device is provided, the method comprising: coating a first optical alignment film on one side of a substrate; irradiating ultraviolet (UV) on the first optical alignment film to be aligned at +45 degrees to a reference direction; irradiating UV on the first optical alignment film to be partially aligned at −45 degrees responsive to a mask pattern; coating and curing a reactive liquid crystal on the first optical alignment film to form a first quarter wave converting layer; coating a second optical alignment film on the other side of the substrate; irradiating UV on the second optical alignment film to be aligned at +45 degrees or −45 degrees relative to a reference direction; coating and curing a second reactive liquid crystal on the second optical alignment film to obtain a phase retardant plate; and aligning and attaching the first quarter wave converting layer of the phase retardant plate to the unit block of the polarization separation unit.

According to the abovementioned configuration, the polarization converting device according to the present disclosure can be easily manufactured in a simple process to free itself from limitation resultant from miniaturization and to prevent light loss in the vicinity of corners.

In a fourth exemplary embodiment of the present disclosure, there is provided a method for manufacturing a polarization converting device configured to continuously form a half phase retarder and selectively remove the half phase retarder, whereby the half phase retarder can be easily formed on the polarization separation unit.

In a fourth exemplary embodiment of the present disclosure, there is provided a method for manufacturing a polarization converting device, the method comprising: preparing a polarization separation unit alternately aligned with a first unit block and a second unit block each including an optical separator bisecting light responsive to polarization direction; coating an alignment material on the polarization separation unit; aligning the alignment material at 45 degrees relative to a reference direction; coating a reactive liquid crystal on the aligned alignment material; and partially removing the reactive liquid crystal to allow being arranged only on the first unit block or the second unit block and to form a half wave phase retarder.

Furthermore, in a fourth exemplary embodiment of the present disclosure, there is provided a method for manufacturing, the method comprising: coating an alignment material on a substrate; aligning the alignment material at 45 degrees relative to a reference direction; coating a reactive liquid crystal on the aligned alignment material; removing the reactive liquid crystal at a predetermined interval to form a half phase retarder; and arranging and attaching the half phase retarder only on a first unit block or a second unit block of a polarization separation unit.

According to the abovementioned configuration, the phase retardation element can be easily manufactured in a simple process to free itself from limitation resultant from miniaturization.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
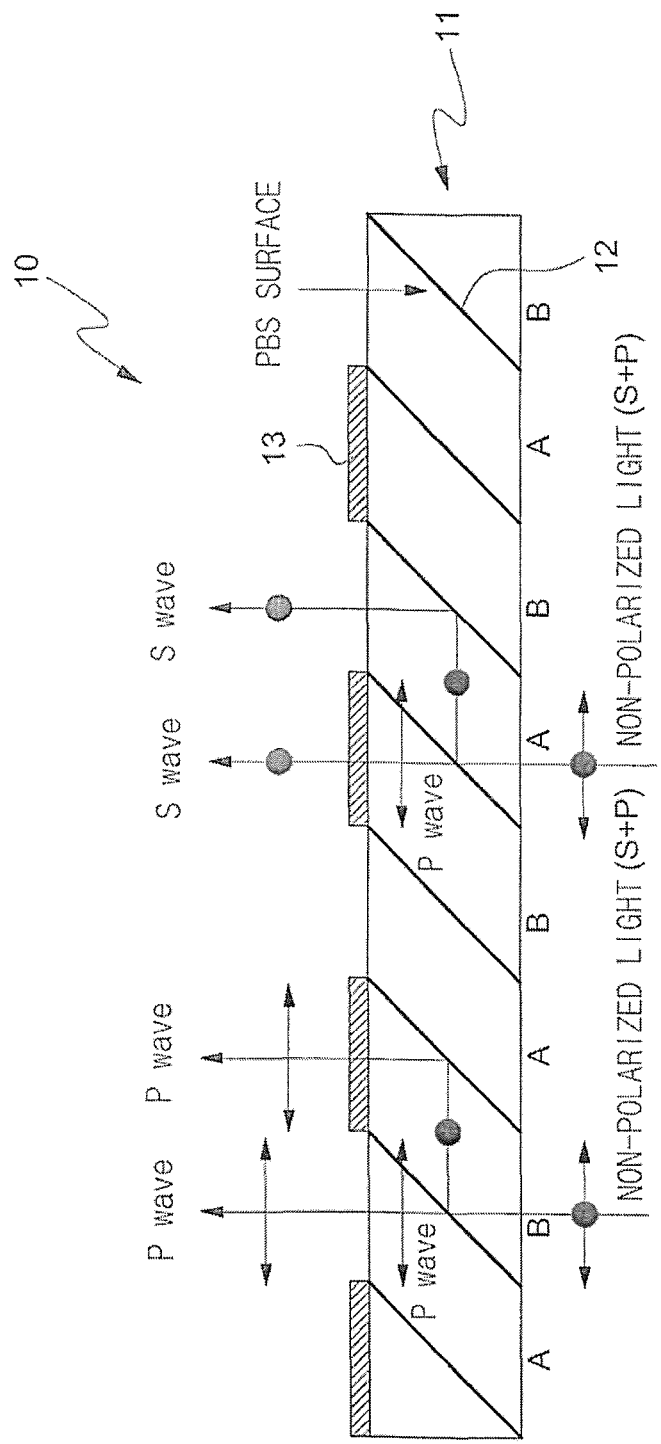
FIG. 1 is a cross-sectional view of a polarization converting device according to prior art.

Although the present disclosure may be implemented in various modifications and exemplary embodiments, particular exemplary embodiments will be illustrated and detailed explanation thereto will be provided. The exemplary embodiments may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. Accordingly, the described aspect is intended to embrace all such alterations, modifications, and variations that fall within the scope and novel idea of the present disclosure.

Meanwhile, the terminology used herein is for the purpose of describing particular implementations only and is not intended to be limiting of the invention. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

For example, a second constituent element may be denoted as a first constituent element without departing from the scope and spirit of the present disclosure, and similarly, a first constituent element may be denoted as a second constituent element.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout.

Now, the present disclosure will be described in detail with reference to the accompanying drawings.

Figure 2:
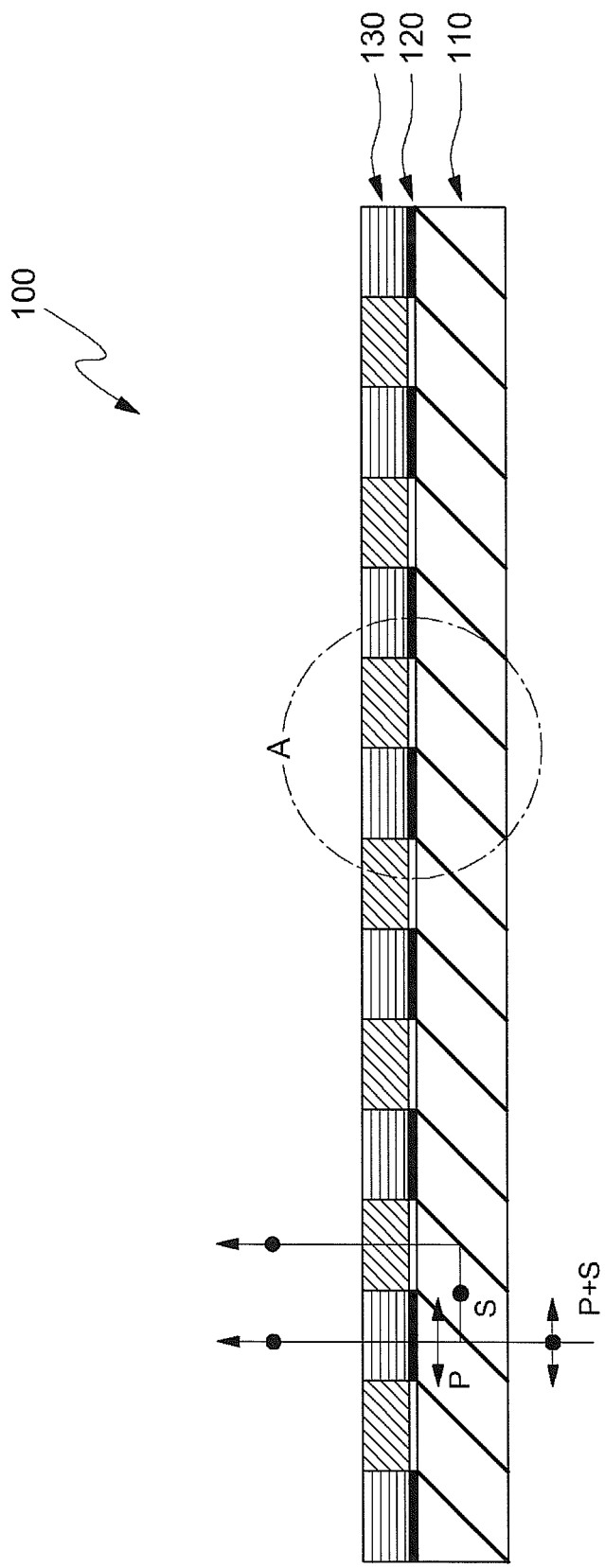
FIG. 2 is a cross-sectional view of a polarization converting device according to a first exemplary embodiment of the present disclosure.
Figure 3:
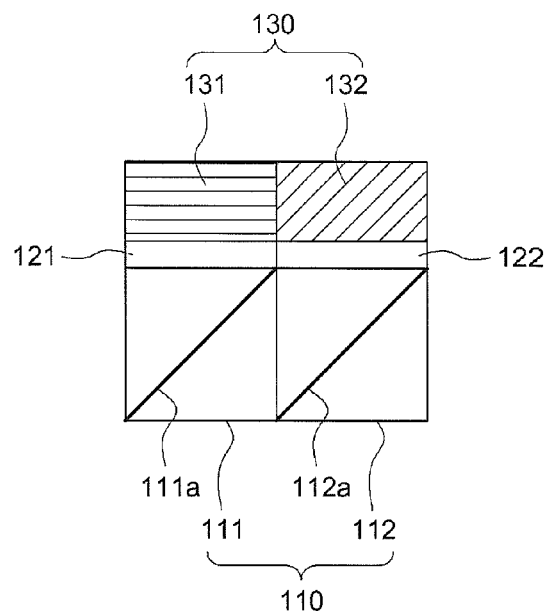
FIG. 3 is a partially enlarged view of "A" portion of FIG. 2.

FIG. 2 is a cross-sectional view of a polarization converting device according to a first exemplary embodiment of the present disclosure, and FIG. 3 is a partially enlarged view of "A" portion of FIG. 2.

The polarization converting device according to a first exemplary embodiment of the present disclosure may include a polarization separation unit 110 arranged with a plurality of unit blocks including an optical separator 111a transmitting a first polarization between an upper surface and a lower surface and reflecting a second polarization, and a phase retarder 130 aligned in correspondence to an upper surface of each unit block of the polarization separation unit 110 where a first region and a second region are alternately formed.

At this time, a fly eye lens 900 for collecting light may be mounted at the polarization separation unit 110.

The polarization separation unit 110 is a conceptual element in which light is separated responsive to a polarization direction, whereby non-polarized light is incident and emitted as a polarized light.

The polarization separation unit 110 may be configured with a PBS (Polarizing Beam Splitter) array 110 continuously formed with a PBS surface having a predetermined pitch bisecting light between an upper plate and a lower plate along the polarization direction.

The PBS surface (hereinafter referred to as 'optical separator') is formed with a multi-layer coating consisting of one or more materials, and a first polarization is transmitted but a second polarization is reflected from the PBS surface, in a case non-polarized light is incident, where the first polarization is defined as a P wave existing on a plain surface formed by a vertical vector on a surface on which light is incident and a light-progressing vector, and the second polarization is defined as an S wave perpendicular to the P wave.

The optical separator 111a is inclined 45 degrees to the optical polarization direction, and the optical separator 111a having a diagonal pitch may be considered as a unit block.

Now, for the convenience sake, the unit block of the PBS array 110 may be explained as a region including an optical separator between an upper substrate and a lower substrate.

Referring to FIG. 3, in a case non-polarized light is incident on a first unit block 111, a first optical separator 111a transmits and emits the P wave but reflects the S wave. The reflected S wave is refracted at 90 degrees relative to an initial incident direction to be incident on a second optical separator 112a of a second unit block 112, and refracted again at 90 degrees by the second optical separator 112a of the second unit block 112 to be emitted to the outside.

That is, the P wave of the non-polarized light is forthright emitted from the incident first unit block 111, while the S wave is emitted from the second unit block 112 by refraction, whereby the light is bisected responsive to the polarization direction. Therefore, the PBS array 110 is formed by a plurality of first and second unit blocks 111, 112 to bisect the light in response to the polarization direction.

At this time, the phase retarder 130 retards by λ/2 the phase of the light emitted from the PBS array 110 to convert the P wave to S wave or convert the S wave to P wave. The phase retarder 130 is formed with reactive mesogens, where a first region 131 and a second region 132 are alternately formed. The first region 131 has an optical axis with an angle horizontal with or vertical to the incident polarization direction to transmit the incident polarization while the second region 132 has an optical axis with a 45 degree-angle relative to the incident polarization direction to convert the polarization of incident light.

The first and second regions 131, 132 are correspondingly formed on an upper surface of each unit block of the PBS array 110. For example, if the first region 131 of the phase retarder 130 is formed at the first unit block 111 of the PBS array 110, the second region 132 is formed at the second unit block 112.

The P wave incident on and transmitted to the first unit block 111 of the phase retarder 130 transmits or passes without being converted when passing through the phase retarder 130, while the S wave emitted upwards of the second unit block 112 passes the second region 132 of the phase retarder 130 to be delayed in phase and converted to P wave. Resultantly, all the light passing through the polarization converting device 100 is emitted as P wave.

Conversely, the first region 131 of the phase retarder 130 may be formed at the second unit block 112 of the PBS array 110, while the second region 132 may be formed at the first unit block 111, where all the light passing through the polarization converting device 100 is emitted as S wave.

The first and second regions 131, 132 of the phase retarder 130 may be formed by optical alignment, alternately at 0.3~0.7 mm interval, to have a fine pattern, or the first and second regions 131, 132 may have the same refractive index but have a different optical axis.

Therefore, the phase retarder 130 may be arranged on the PBS array 110 in a polarization converting device of a small-sized projector, where the refractive indexes of the first region 131 and the second region 132 are the same such that light passing through the first region 131 and light passing through the second region 132 are emitted to a predetermined direction.

There is an advantage of increased light-collecting effect because the light passing through the first region 131 and the light passing through the second region 132 have the same progressing direction. There is another advantage of solving the light loss because the refractive indexes are identical to reduce refraction angles, whereby the light passing through the first region 131 of the phase retarder 130 is refracted to pass a corner portion of the second region 132 and to free from being lost.

Furthermore, the first region 131 and the second region 132 of the phase retarder 130 are each formed with a thin film of 20~50 μm, whereby the probability of light simultaneously passing through the first region 131 and the second region 132 of the phase retarder 130 among the light incident on the phase retarder 130 via the PBS array 110 is further reduced.

The phase retarder 130 is formed thereunder with an alignment material 120, which may be aligned at a predetermined angle by rubbing or optical alignment, and function to form a predetermined optical axis for the phase retarder 130. The alignment material 120 may be an optical alignment film 120 and may be formed with a different alignment direction responsive to a predetermined interval.

The optical alignment film may be called a photo alignment film.

To be more specific, the alignment material 120 is alternately formed with a first area 121 having a vertical or horizontal angle relative to an optical polarization direction responsive to a predetermined interval, and a second area 122 having a 45-angle relative to the optical polarization direction.

Thereafter, in a case a reactive liquid crystal 130 is coated on the alignment material 120, the reactive liquid crystal 130 comes to be formed with an optical axis based on the alignment direction of the alignment material 120, where the optical axis of the first region 131 at the phase retarder 130 stands vertical or horizontal with the optical polarization direction while the optical axis of the second region 132 stands at 45 degrees relative to the optical axis of the first region 131.

Now, the process of light being aligned in the configuration thus mentioned will be described.

The non-aligned light is initially collected through a fly eye lens to be incident on the optical separator 111a, where the P wave passes the optical separator 111a and the first region of the phase retarder 130 to be emitted to the outside.

At this time, the first region 131 of the phase retarder 130 is configured with an optical axis horizontal or vertical relative to the polarization direction of P wave, such that the P wave is not refracted but emitted as it is.

However, the S wave is reflected by the first optical separator 111a of the first unit block 111 to be incident on the second unit block 112, and reflected by the second optical separator 112a to pass the second region 132 of the phase retarder 130 and to be emitted to the outside. The second region 132 of the phase retarder 130 is formed with an optical axis with 45 degrees relative to the polarization direction of S wave, whereby the S wave is converted to P wave and emitted as P wave. Therefore, all the light having passed the polarization converting device 100 is converted to P wave and emitted to the outside as the P wave.

Figure 4:
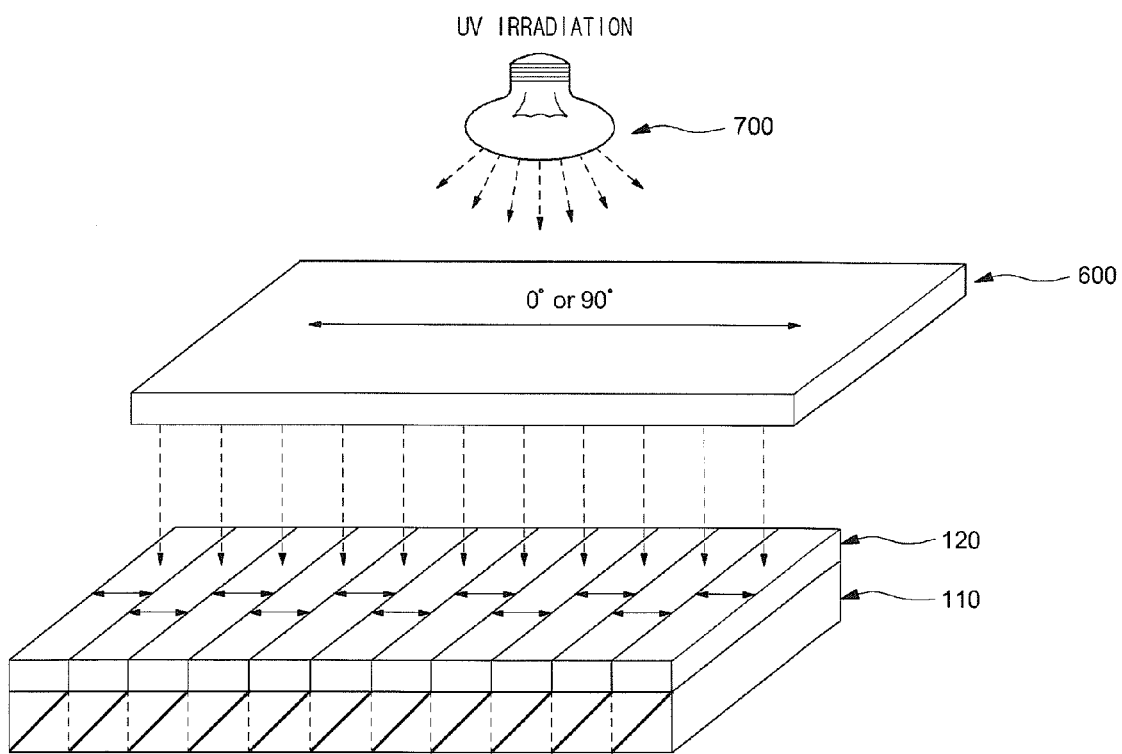
FIG. 4 is a perspective view illustrating an aligning processing of an alignment material of a polarization converting device to a reference direction according to a first exemplary embodiment of the present disclosure.
Figure 5:
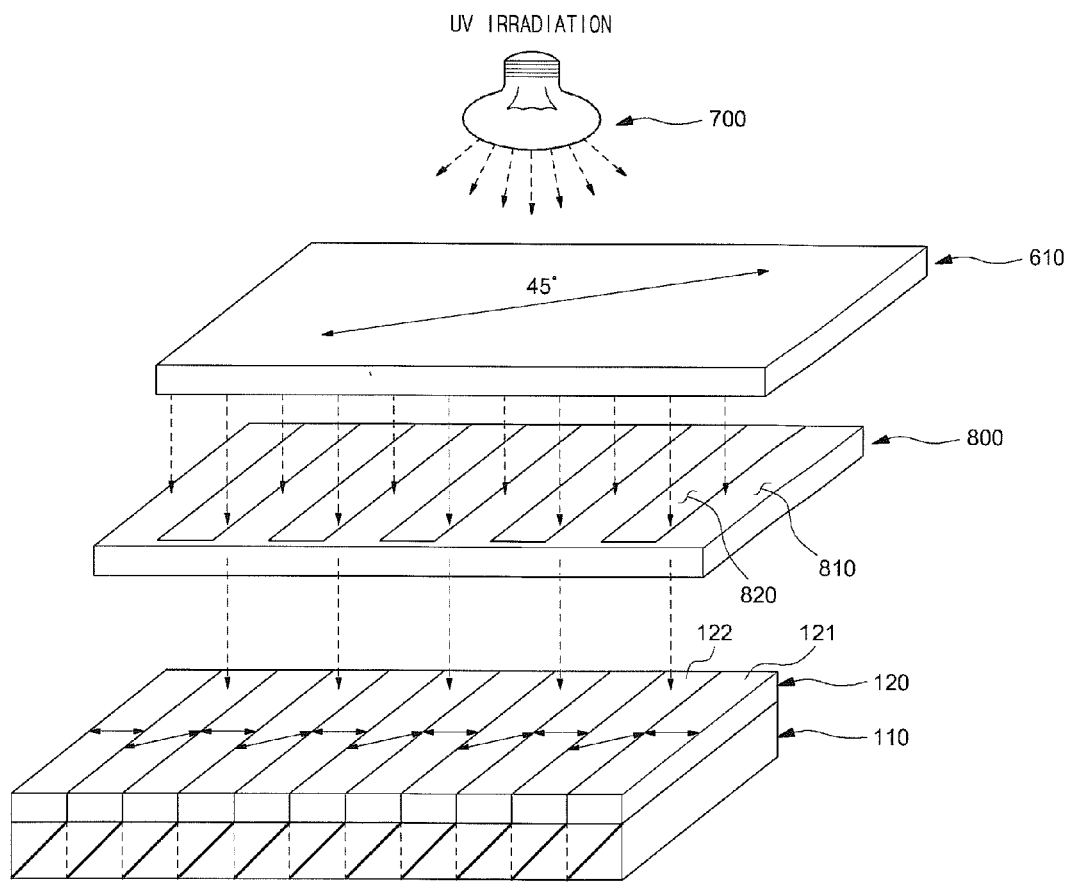
FIG. 5 is a perspective view illustrating a partially aligning processing of an alignment material of a polarization converting device at 45 degrees according to a first exemplary embodiment of the present disclosure.
Figure 6:
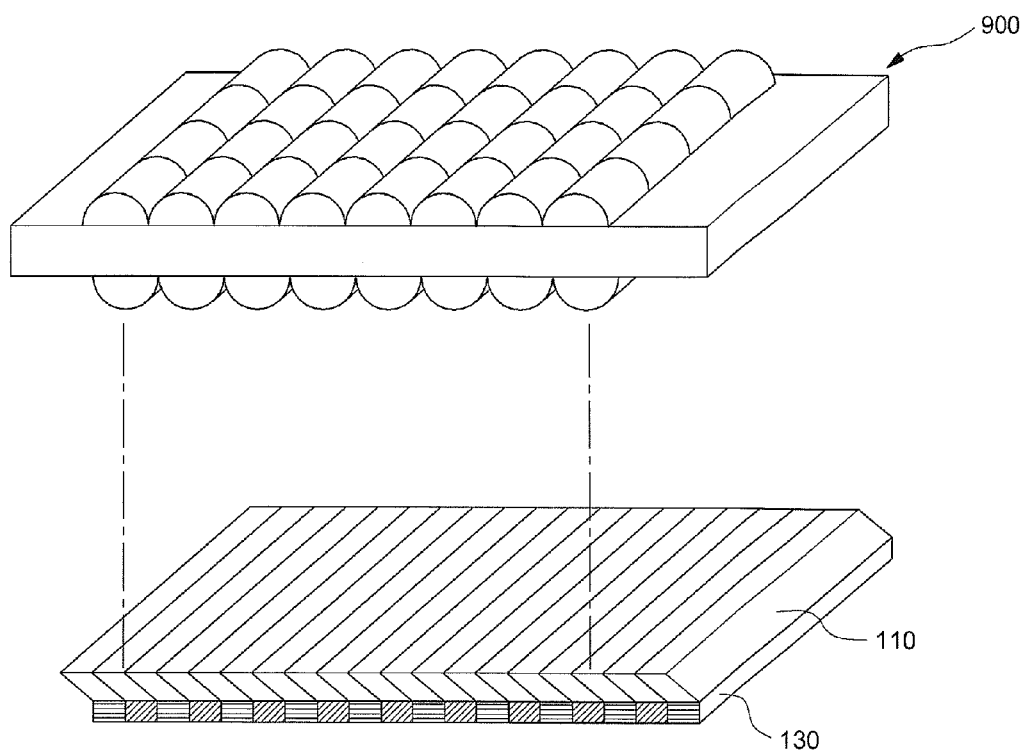
FIG. 6 is a coupled perspective view illustrating a fly eye lens being attached to a polarization converting device according to a first exemplary embodiment of the present disclosure.
Figure 7:
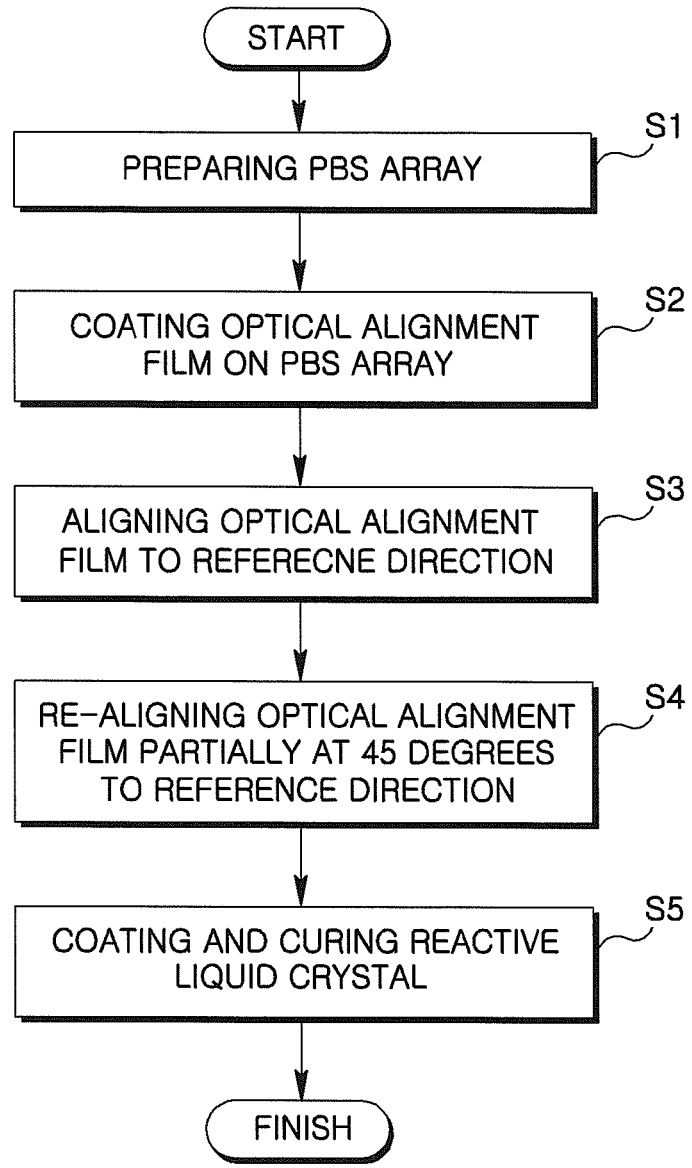
FIG. 7 is a flowchart of a polarization converting device according to a first exemplary embodiment of the present disclosure.

FIG. 4 is a perspective view illustrating an aligning processing of an alignment material of a polarization converting device to a reference direction according to a first exemplary embodiment of the present disclosure, FIG. 5 is a perspective view illustrating a partially aligning processing of an alignment material of a polarization converting device at 45 degrees according to a first exemplary embodiment of the present disclosure, FIG. 6 is a coupled perspective view illustrating a fly eye lens being attached to a polarization converting device according to a first exemplary embodiment of the present disclosure, and FIG. 7 is a flowchart of a polarization converting device according to a first exemplary embodiment of the present disclosure.

Now, a method for manufacturing a polarization converting device 100 according to the first exemplary embodiment of the present disclosure will be described.

First of all, a PBS array 110 arranged with a plurality of unit blocks including an optical separator 111a bisecting light is prepared. Thereafter, an upper surface of the unit block of the PBS array 110 is uniformly coated with an optical alignment film 120. At this time, the material of the optical alignment film 120 may be an organic material of polyimide group, and may be used with a spin coater for applying a uniform coating.

Successfully, as illustrated in FIG. 4, in a case UV is irradiated on the optical alignment film 120 using a first UV polarization plate 600 of a reference direction, the optical alignment film 120 is aligned to the reference direction, where the term of "reference direction" defines a direction perpendicular to or horizontal with a lengthwise direction of the alignment film if light is incident, or a direction perpendicular to or horizontal with an optical polarization direction of the alignment film.

Then, a second UV polarization plate 610 is prepared on the optical alignment film 120 that is horizontally or vertically aligned, a patterned mask 800 is inserted between the second UV polarization plate 610 and the phase retarder 130, to which UV is irradiated.

At this time, the mask pattern is alternately formed with a transmissive region 820 and a non-transmissive region 810, where each width of the transmissive region 820 and the non-transmissive region 810 is patterned with a fine interval of 0.3~0.7 mm, and is constructed in the same manner as that of the upper surface of unit block of the PBS array 110.

For example, in a case a width of the upper surface of the unit block in the PBS array 110 is 0.5 mm, each width of the transmissive region 820 and the non-transmissive region 810 is patterned in the same width as 0.5 mm.

Therefore, a section 122 underneath the transmissive region 820 of the mask pattern is aligned at 45 degrees whereby the alignment direction of the optical alignment film 120 varies based on the regional unit.

Through the abovementioned process, the optical alignment film 120 is alternately formed with the area 121 having an alignment direction vertical to or horizontal with the optical polarization direction and the area 122 slantingly aligned at 45 degrees, where the alternate areas precisely correspond with the unit blocks 111 112 of the PBS array 110.

However, the alignment method of the optical alignment film 120 is not limited thereto. For example, only a predetermined region may be aligned to the reference direction according to the mask 800 pattern, and another region may be aligned at 45 degrees according to the mask 800 pattern.

Thereafter, as illustrated in FIG. 6, in a case the optical alignment film 120 is coated with the reactive liquid crystal 130, the reactive liquid crystal 120 comes to have an optical axis responsive to the alignment direction of the optical alignment film 120, and if the film 120 is cured, the first region 131 and the second region 132 of the phase retarder 130 can be precisely aligned with the width of the upper surface of the unit block at the PBS array 110. It should be noted that the reactive liquid crystal and the phase retarder use the same reference numeral because the reactive liquid crystal forms the phase retarder.

At this time, an opposite surface where the PBS array 110 is formed with the phase retarder 130 may be stacked with fly eye lenses 900 to allow the non-polarized light to be collected at the PBS array 110.

Figure 8:
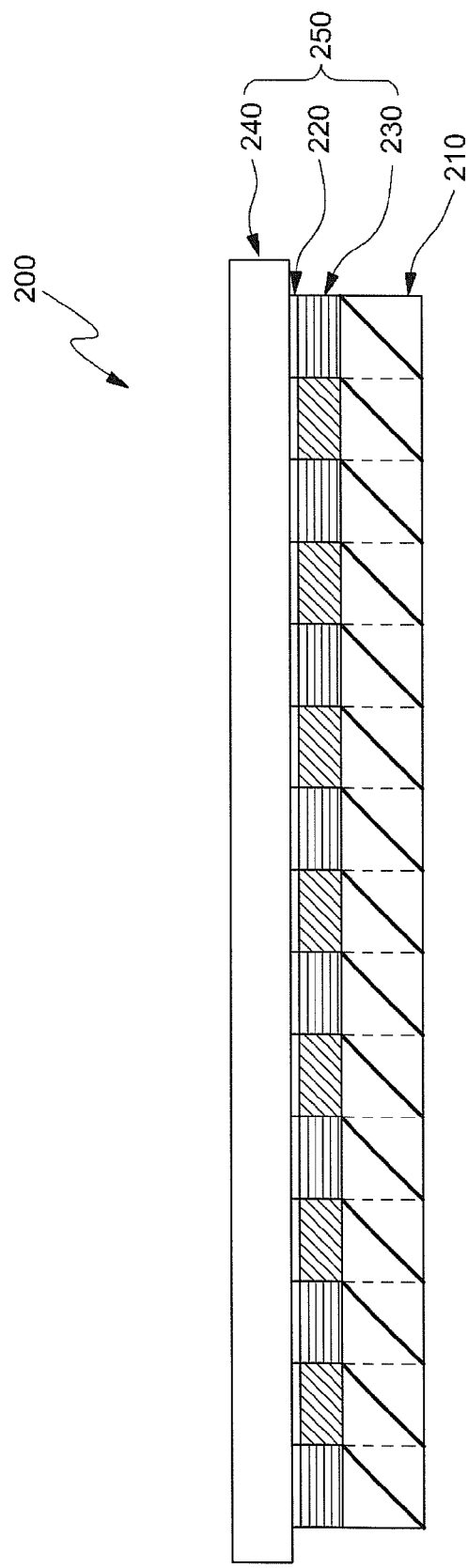
FIG. 8 is a flowchart of a polarization converting device according to a second exemplary embodiment of the present disclosure.
Figure 9:
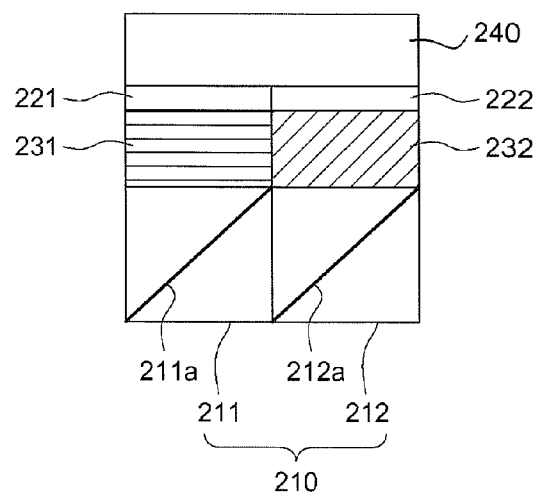
FIG. 9 is a partially enlarged view of FIG. 8.

FIG. 8 is a flowchart of a polarization converting device according to a second exemplary embodiment of the present disclosure, and FIG. 9 is a partially enlarged view of FIG. 8.

The polarization converting device according to a second exemplary embodiment of the present disclosure may include a polarization separation unit 210 arranged with a plurality of unit blocks including an optical separator 211a reflecting a first polarization and transmitting a second polarization, and a phase retardant layer 230 aligned in correspondence to an upper surface of each unit block 211 of the polarization separation unit 110 where a first region 231 and a second region 232 are alternately formed, and formed thereon with a substrate thereon.

The polarization separation unit 210 is a conceptual element in which light is separated responsive to a polarization direction, whereby non-polarized light is incident and emitted as a polarized light.

The polarization separation unit 210 may be configured with a PBS (Polarizing Beam Splitter) array 110 continuously formed with a PBS surface having a predetermined pitch bisecting light between an upper plate and a lower plate along the polarization direction.

The PBS surface (hereinafter referred to as 'optical separator') is formed with a multi-layer coating consisting of one or more materials, and a first polarization is transmitted but a second polarization is reflected from the PBS surface, in a case non-polarized light is incident, where the first polarization is defined as a P wave existing on a plain surface formed by a vertical vector on a surface on which light is incident and a light-progressing vector, and the second polarization is defined as an S wave perpendicular to the P wave.

The optical separator 211a is inclined 45 degrees to an optical polarization direction, and the optical separators 211a, 212a each having a predetermined pitch may be considered as a unit block.

Now, for the convenience sake, the unit block of the PBS array 210 may be explained as a concept including an optical separator between an upper substrate and a lower substrate.

Referring to FIG. 9, in a case non-polarized light is incident on a first unit block 211, the first optical separator 211a transmits and emits the P wave but reflects the S wave. At this time, as the first optical separator 221a is inclined at 45 degrees relative to an optical incident direction, the reflected S wave is refracted at 90 degrees relative to an initial incident direction and is incident on the second optical separator 212a of a second unit block 212, and refracted again at 90 degrees by the second optical separator 212a of the second unit block 212 to be emitted to the outside.

That is, the P wave of the non-polarized light is forthright emitted from the incident first unit block 211, while the S wave is emitted from the second unit block 212 by refraction, whereby the light is bisected responsive to the polarization direction. Therefore, the PBS array 210 is formed by a plurality of first and second unit blocks 211, 212 to bisect the light in response to the polarization direction.

At this time, the phase retardant layer 230 retards by λ/2 the phase of the light emitted from the PBS array 210 to convert the P wave to S wave or convert the S wave to P wave. The phase retardant layer 230 is formed with reactive mesogens, where a first region 231 and a second region 232 are alternately formed on a substrate 240 to form a phase retarder 250. The first region 231 has an optical axis with an angle horizontal with or vertical to the incident polarization direction to transmit the incident polarization while the second region 232 has an optical axis with a 45 degree-angle relative to the incident polarization direction to convert the polarization of incident light.

There is an advantage in that the first and second regions 131, 132 are formed on the substrate 240 without separately forming an align mark on the PBS array 210 to be correspondingly attached on an upper surfaces of each unit block 211, 212 of the PBS array 210.

Therefore, there is an advantage in that the first region 231 and the second region 232 are formed on the substrate such as a glass or a base film to manufacture the phase retardant layer 230, and are selectively attached to the PBS array 210 according to desired polarization.

For example, if the first region 231 of the phase retardant layer 230 is formed on the upper surface of the first unit block 211 of the PBS array 110, the second region 232 may be formed at the second unit block 212.

The P wave incident on and transmitted to the first unit block 211 of the phase retardant layer 230 is transmitted or passes without being converted when passing through the phase retardant layer 230, while the S wave emitted upwards of the second unit block 212 passes the second region 232 of the phase retardant layer 230 to be delayed in phase and converted to P wave. Resultantly, all the light passing through the polarization converting device 100 is emitted as P wave.

Conversely, the first region 231 of the phase retardant layer 230 may be formed at the second unit block 212 of the PBS array 210, while the second region 232 may be formed at the first unit block 211, where all the light passing through the polarization converting device 100 is emitted as S wave.

The first and second regions 231, 232 of the phase retardant layer 230 may be formed by optical alignment, alternately at 0.3~0.7 mm interval, to have a fine pattern, such that the phase retardant layer 230 may have a fine pattern of 0.3~0.7 mm interval that can be easily aligned on the PBS array 210 in the polarization converting device of a small-sized projector.

Furthermore, the first and second regions 231, 232 may have the same refractive index, such that light passing through the first region 231 and the light passing through the second region 232 may be refracted and emitted at a predetermined direction.

There is an advantage of increased light-collecting effect because the light passing through the first region 231 and the light passing through the second region 232 have the same progressing direction. There is another advantage of solving the light loss because the light passing through the first region 231 and the second region 232 of the phase retardant layer 230 is refracted from a corner portion.

Furthermore, the first region 231 and the second region 232 of the phase retardant layer 230 are each formed with a thin film of 20~50 μm, whereby the probability of light simultaneously passing through the first region 231 and the second region 232 of the phase retardant layer 230 among the light incident on the phase retardant layer 230 via the PBS array 110 can be reduced.

An alignment material 220 is formed between the phase retardant layer 230 and the substrate 240, which may be aligned at a predetermined angle by rubbing or optical alignment, and function to form a predetermined optical axis for the phase retardant layer 230. The alignment material 220 may be an optical alignment film 220 and may be formed with a different alignment direction responsive to a predetermined interval.

To be more specific, the alignment material 220 is alternately formed with a first area 221 having a vertical or horizontal (matching) angle relative to an optical polarization direction responsive to a predetermined interval, and a second area 222 having a 45-angle relative to the optical polarization direction.

Thereafter, in a case a reactive liquid crystal 230 is coated on the optical alignment film 220, the reactive liquid crystal 230 comes to be formed with an optical axis based on the alignment direction of the optical alignment film 220, where the optical axis of the first region 231 at the phase retardant layer 230 stands vertical or horizontal with the optical polarization direction while the optical axis of the second region 232 stands at 45 degrees relative to the optical axis of the first region 231.

Now, the process of light being aligned in the configuration thus mentioned will be described.

The non-aligned light is initially collected through a fly eye lens (not shown) to be incident on the first optical separator 211a of the first unit block 211, where the P wave passes the first optical separator 211a and the first region 231 of the phase retardant layer 230 to be emitted to the outside.

At this time, the first region 231 of the phase retardant layer 230 is configured with an optical axis horizontal or vertical relative to the polarization direction of P wave, such that the P wave is not refracted but emitted as it is.

However, the S wave is reflected by the first optical separator 211a of the first unit block 211 to be incident on the second unit block 212, and reflected by the second optical separator 212a to pass the second region 232 of the phase retardant layer 230 and to be emitted to the outside. The second region 232 of the phase retardant layer 230 is formed with an optical axis at 45 degrees relative to the polarization direction of S wave, whereby the S wave is converted to P wave and emitted as P wave. Therefore, all the light having passed the polarization converting device 100 is converted to P wave and emitted to the outside as the P wave.

Figure 10:
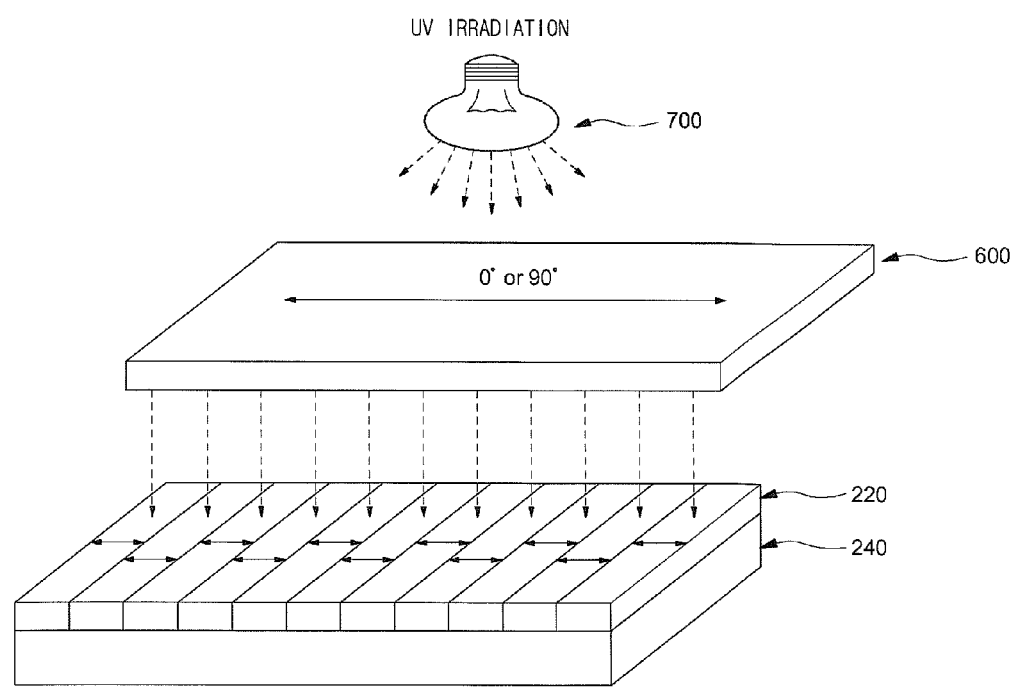
FIG. 10 is a perspective view illustrating an optical alignment film of a polarization converting device being aligned to a reference direction according to a second exemplary embodiment of the present disclosure.
Figure 11:
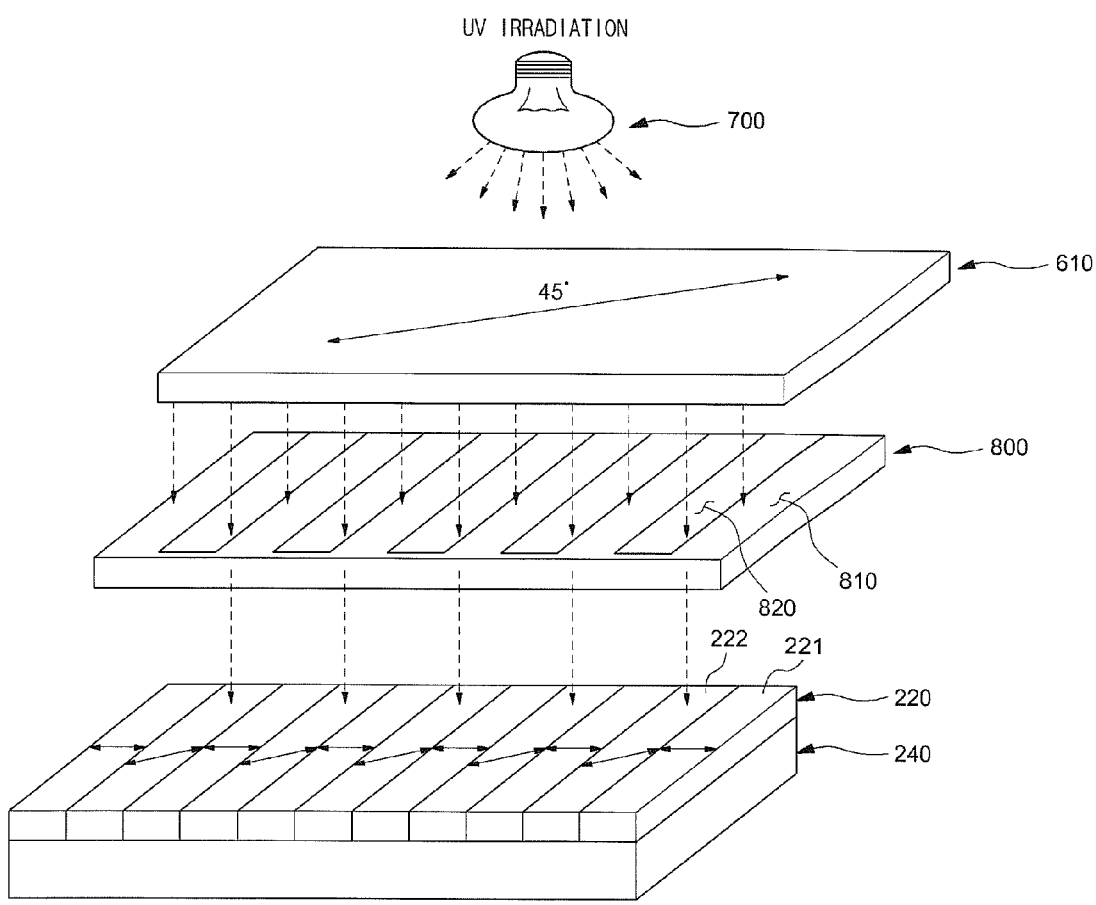
FIG. 11 is a perspective view illustrating a partially aligning processing of an optical alignment film of a polarization converting device at 45 degrees according to a second exemplary embodiment of the present disclosure.
Figure 12:
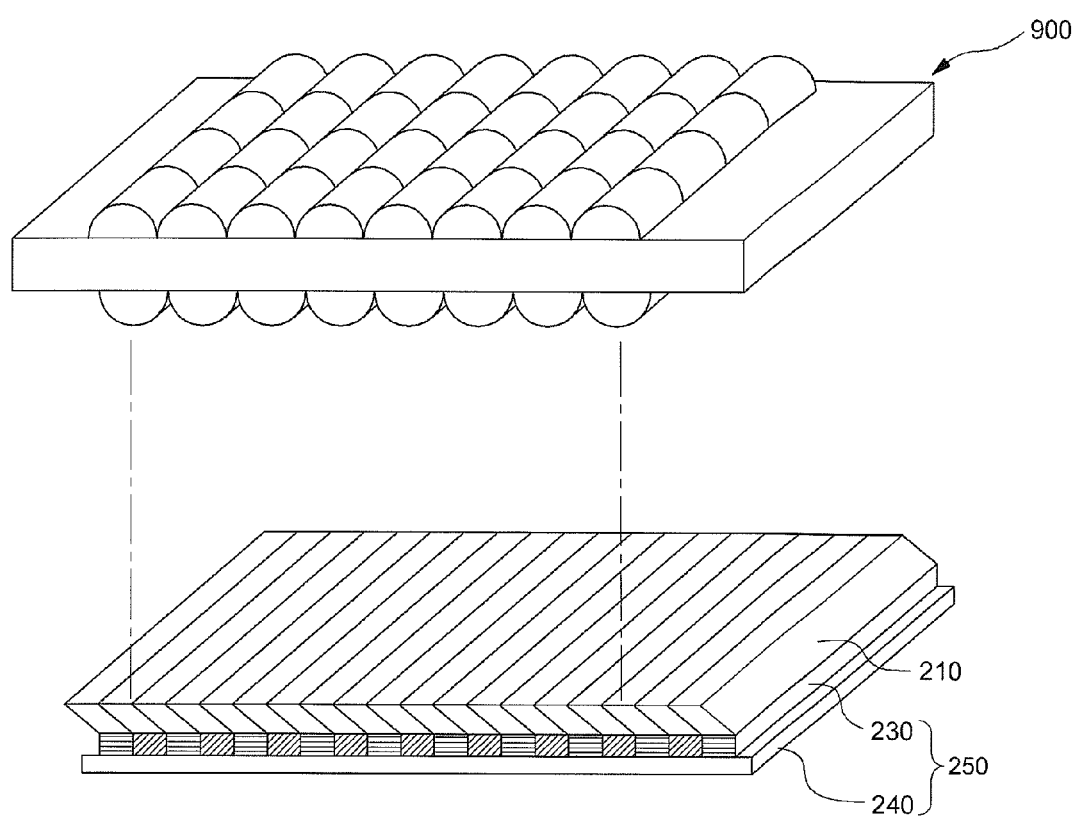
FIG. 12 is a coupled perspective view illustrating a fly eye lens being attached to a polarization converting device according to a second exemplary embodiment of the present disclosure.
Figure 13:
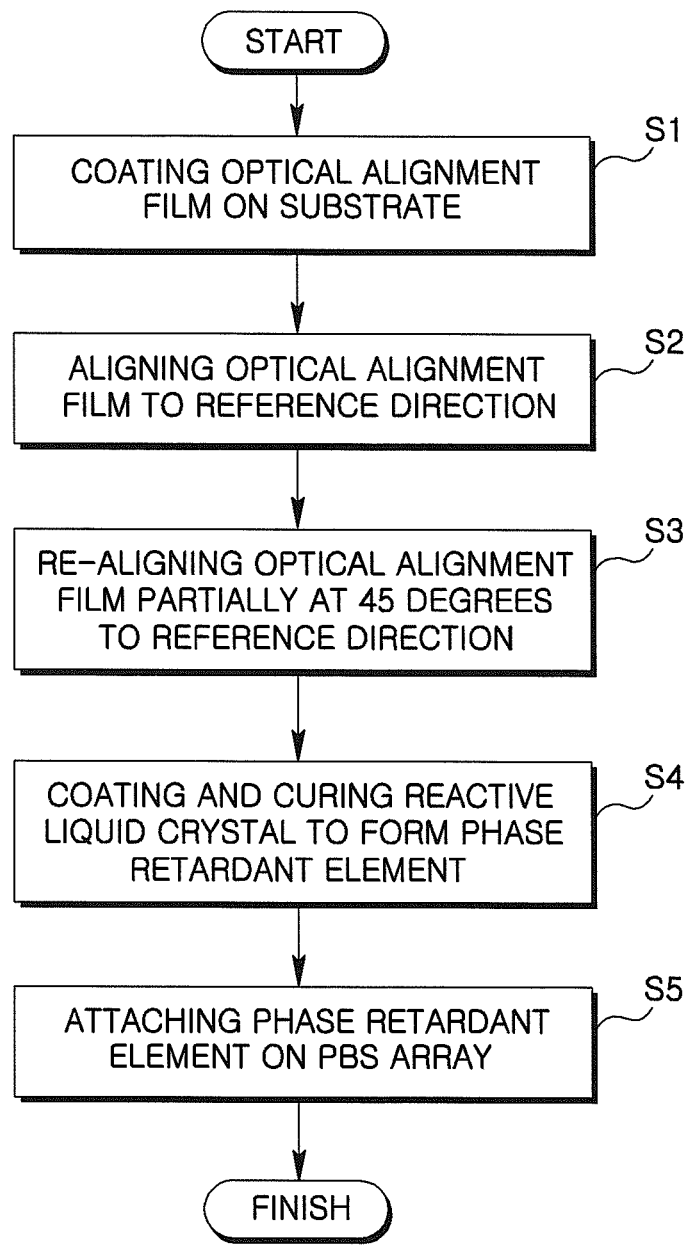
FIG. 13 is a flowchart of a polarization converting device according to a second exemplary embodiment of the present disclosure.

FIG. 10 is a perspective view illustrating an optical alignment film of a polarization converting device being aligned to a reference direction according to a second exemplary embodiment of the present disclosure, FIG. 11 is a perspective view illustrating a partially aligning processing of an optical alignment film of a polarization converting device at 45 degrees according to a second exemplary embodiment of the present disclosure, FIG. 12 is a coupled perspective view illustrating a fly eye lens being attached to a polarization converting device according to a second exemplary embodiment of the present disclosure, and FIG. 13 is a flowchart of a polarization converting device according to a second exemplary embodiment of the present disclosure.

Now, a method for manufacturing a polarization converting device according to the second exemplary embodiment of the present disclosure will be described.

First, an upper surface of a substrate 240 is uniformly coated with optical alignment film 220 (S1). Next, in a case a first UV polarization plate 600 of reference direction is arranged on the optical alignment film 220, to which UV is irradiated, the UV polarized to the reference direction is irradiated to allow the optical alignment film 220 to align toward the reference direction (S2).

Successively, a second UV polarization plate 610 is prepared on the optical alignment film 220 that is vertically or horizontally aligned, and a mask 800 patterned between the second UV polarization plate 610 and the phase retardant layer 230, to which UV is irradiated (S3). Therefore, the alignment direction of the optical alignment film 220 corresponding to each unit block of the PBS array 210 varies. Through this process, the optical alignment film 220 is alternately formed with an area 221 having an alignment direction vertical to or horizontal with the optical polarization direction and an area slantingly aligned at 45 degrees, and each of these areas precisely corresponds to the unit block 211 of the PBS array 210.

Successively, in a case the reactive liquid crystal 230 is coated on the optical alignment film 220, the reactive liquid crystal 230 comes to be formed with an optical axis along the alignment direction of the optical alignment film 220, where the reactive liquid crystal 230 is cured to form the phase retardant layer 230 (S4). That is, the phase retarder 250 is formed through these processes.

At this time, the first area 231 and the second area 232 of the phase retardant layer 230 are respectively and correspondingly attached to the widths of the upper surfaces of the unit blocks 211, 212 of the PBS array 210. At this time, in order to emit a desired manufacture polarization, the first area 231 and the second area 232 of the phase retardant layer 230 may be varied in their arrangement direction on the PBS array 210.

For example, the first area 231 of the phase retardant layer 230 is arranged on and attached to the first unit block of the PBS array 210 to allow all the P wave to be emitted in the course of manufacturing, or the second area 232 of the phase retardant layer 230 is attached to allow all the S wave to be emitted in the course of manufacturing. At this time, an opposite surface where the phase retardant layer 230 is formed on the PBS array 210 may be stacked with fly eye lenses 900 to allow the non-polarized light to be collected on the PBS array 210.

Figure 14:
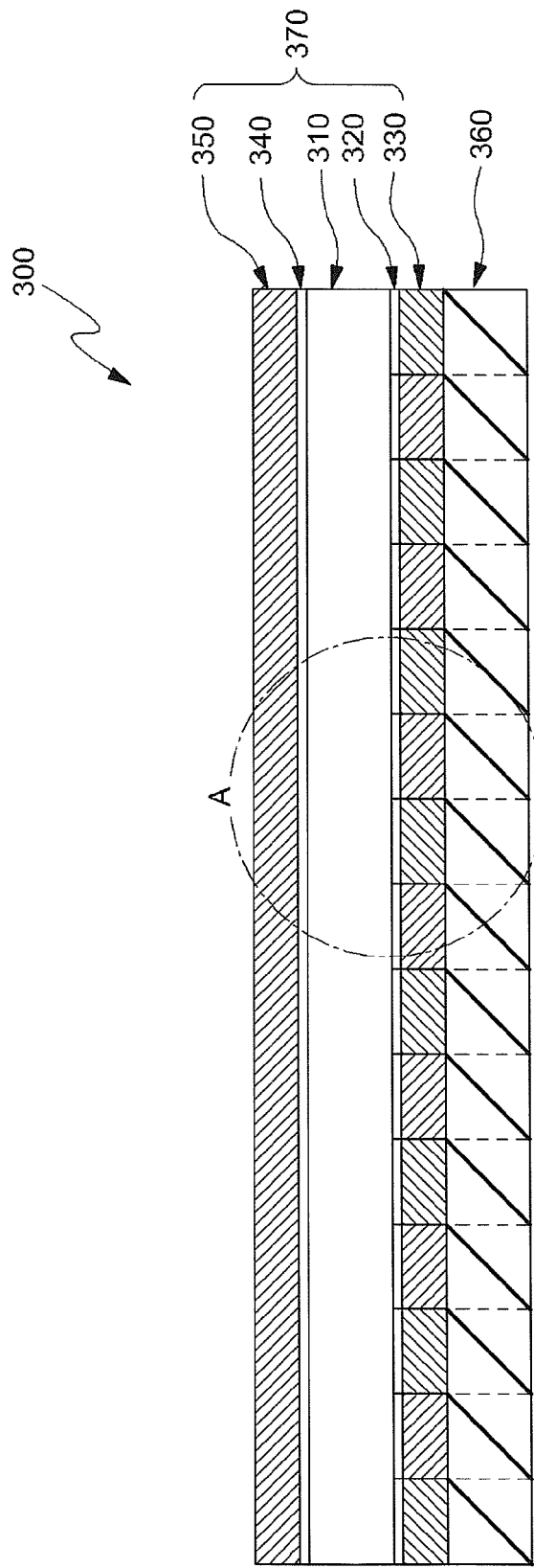
FIG. 14 is a cross-sectional view of a polarization converting device according to a third exemplary embodiment of the present disclosure.
Figure 15:
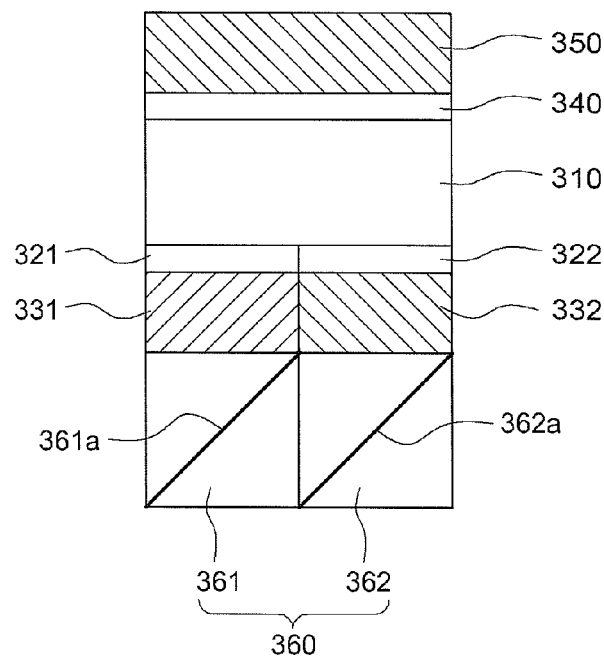
FIG. 15 is a partially enlarged view of "A" portion of FIG. 14.

FIG. 14 is a cross-sectional view of a polarization converting device according to the third exemplary embodiment of the present disclosure, and FIG. 15 is a partially enlarged view of "A" portion of FIG. 14.

A polarization converting device according to the third exemplary embodiment of the present disclosure may comprise: a substrate 310; a first quarter wave converting layer 330 formed at one side of the substrate and alternately formed with a first region 331 having an optical axis in a first direction and a second region 332 having an optical axis perpendicular to the optical axis of the first region 331; a phase retardant plate 370 formed at the other side of the substrate 310 and formed with a second quarter wave converting layer 350 whose entire surface has the same optical axis as that of any one of the first region 331 or the second region 332; and a polarization separation unit 360 attached to the first quarter wave converting layer 330 of the phase retardant plate 370 and arranged with a plurality of unit blocks including optical separators 361a, 362a bisecting light responsive to polarization direction.

The polarization separation unit 360 is a conceptual element in which light is separated responsive to a polarization direction, whereby non-polarized light is incident and emitted as a polarized light.

The polarization separation unit 360 may be configured with a PBS (Polarizing Beam Splitter) array 360 continuously formed with a PBS surface having a predetermined pitch bisecting light between an upper plate and a lower plate along the polarization direction. At this time, the upper plate and the lower plate are generally formed with transparent substrates and are not depicted on the drawings for the explanatory convenience sake.

The PBS surface (hereinafter referred to as 'optical separator') is formed with a multi-layer coating consisting of one or more materials, and a first polarization is transmitted but a second polarization is reflected from the PBS surface, in a case non-polarized light is incident, where the first polarization is defined as a P wave existing on a plain surface formed by a vertical vector on a surface on which light is incident and a light-progressing vector, and the second polarization is defined as an S wave perpendicular to the P wave.

Each of the optical separators 361a, 362a is inclined 45 degrees to an optical polarization direction, and a section where the optical separator 361a having a predetermined pitch is repeated may be considered as a unit block 361, 362.

Now, for the convenience sake, the unit block of the PBS array 360 may be explained as a concept in which an optical separator 361a is included in a block.

In a case non-polarized light is incident on a first unit block 361, the first optical separator 361a transmits and emits the P wave but reflects the S wave. At this time, as the first optical separator 361a is inclined at 45 degrees relative to an optical incident direction, the reflected S wave is refracted at 90 degrees relative to an initial incident direction and is incident on the second optical separator 362a of a second unit block 362, and refracted upwards again at 90 degrees by the second optical separator 362a of the second unit block 362 to be emitted to the outside.

That is, the P wave of the non-polarized light is forthright emitted from the first unit block 361, while the S wave is emitted from the second unit block 362 by refraction, whereby the light is bisected responsive to the polarization direction. Therefore, the PBS array 360 is formed with a plurality of first and second unit blocks 361, 362 to bisect the light in response to the polarization direction.

At this time, the phase retardant plate 370 retards by $\lambda/2$ the phase of the light emitted from the PBS array 360 to convert the P wave to S wave or convert the S wave to P wave. The phase retardant plate 370 is formed with the first quarter wave converting layer 330 including reactive mesogens and the second quarter wave converting layer 350, where the first quarter wave converting layer 330 is alternately formed with the first region 331 and the second region 332. The first region 331 of the first quarter wave converting layer 330 has an optical axis with an angle of 45 degrees relative to incident polarization direction to convert the incident polarization by $\lambda/4$ while the second region 332 has an optical axis vertical to the optical axis of the first region 331 to convert the incident polarization by $\lambda/4$.

In the configuration thus described, in a case the incident light passes the first region 331 to get advanced in phase thereof by $\lambda/4$, the light incident on the second region may be delayed in phase by $\lambda/4$.

The first region 331 and the second region 332 may be correspondingly formed on the upper surfaces of each unit block 361, 362 of the PBS array 360. For example, in a case the first region 331 is formed on the first unit block 361 of the PBS array 360, the second region 332 may be formed on the second unit block 362.

According to the configuration thus explained, the P wave that is incident on and transmitted to the first unit block 361 is converted in phase by $\lambda/4$ when passing through the first region 331, and the S wave emitted upwards of the second unit block 362 is converted in phase by λ/4 and emitted when passing through the second region 332.

The first and second regions 331, 32 may be alternately formed at 0.3~0.7 mm interval, to have a fine pattern, such that the phase retardant plate 370 can be easily aligned on the PBS array 360 in the polarization converting device of a small-sized projector.

Furthermore, the first and second regions 331, 332 may have the same refractive index but with respectively different optical axes, such that light passing through the first region 331 and the light passing through the second region 332 may be refracted and emitted at a similar angle to be incident on the substrate 310.

The first region 331 and the second region 332 are formed with a thin film of 1~20 μm, such that the possibility may be reduced that the light incident on the first region 331 is refracted to simultaneously pass the second region 332 at a slant direction.

Furthermore, an alignment material 320 is formed between the first quarter wave converting layer 330 and the substrate 310, which may be aligned at a predetermined angle by rubbing or optical alignment to allow forming a predetermined optical axis on the first quarter wave converting 330. The alignment material 320 may be an optical alignment film and may be formed with a different alignment direction responsive to a predetermined interval.

To be more specific, the alignment material 320 is alternately formed with a first area 321 having a 45-angle relative to the optical polarization direction responsive to a predetermined interval, and a second area 322 having an axis vertically inclined relative to the optical axis of the first area 321. The other side of the substrate 310 is formed with the second quarter wave converting layer 350 having an optical axis of 45 degrees relative to the incident optical polarization.

The entire surface of the second quarter wave converting layer 350 is continuously formed to have an optical axis identical to any one optical axis of the first region 331 or the second region 332 of the first quarter wave converting layer 330, whereby all the incident wave is converted by λ/4. The second quarter wave converting layer 350 may be formed with a thickness of 1~20 μm, such that the entire surface is formed with the uniform optical axes.

Now, the overall process of the light being polarized in the abovementioned configuration will be described.

A non-polarized light is incident on the optical separator 361a of the first unit block 361, where the P wave passes the optical separator 361a to be incident on the first region 331, and converted by λ/4 in the course of passing through the first region 331.

Furthermore, the S wave is reflected by the first optical separator 361a of the first unit block 361 to be incident on the second unit block 362, and reflected by the second optical separator 362a to be converted by λ/4 in the course of passing through the second region 332 of the first quarter wave converting layer 330.

At this time, because respective optical axes of the first region 331 and the second region 332 are perpendicular to each other, the phase of S wave is retarded by λ/4 if the P wave is advanced in phase by λ/4, and vice versa. Successively, the P wave and the S wave pass the substrate 310 to be incident on the second quarter wave converting layer 350.

At this time, if the optical axis of the second quarter wave converting layer 350 is same as that of the first region 331 at the first quarter wave converting layer 330, the P wave is additionally converted by λ/4 (final conversion by λ/2) to converted to S wave.

However, the S wave is reversely converted by λ/4 in the state of λ/4 conversion, such that there is no phase conversion in the whole to the S wave. Therefore, if the optical axis of the second quarter wave converting layer 350 is same as that of the first region 331 of the first quarter wave converting layer 330, the P wave passing through the phase retardant plate 370 is converted to and emitted as S wave, such that S wave is emitted on the whole.

Conversely, if the optical axis of the second quarter wave converting layer 350 is same as that of the second region 332, the light passing through the phase retardant plate 370 is converted to P wave, such that P wave is emitted on the whole.

Figure 16:
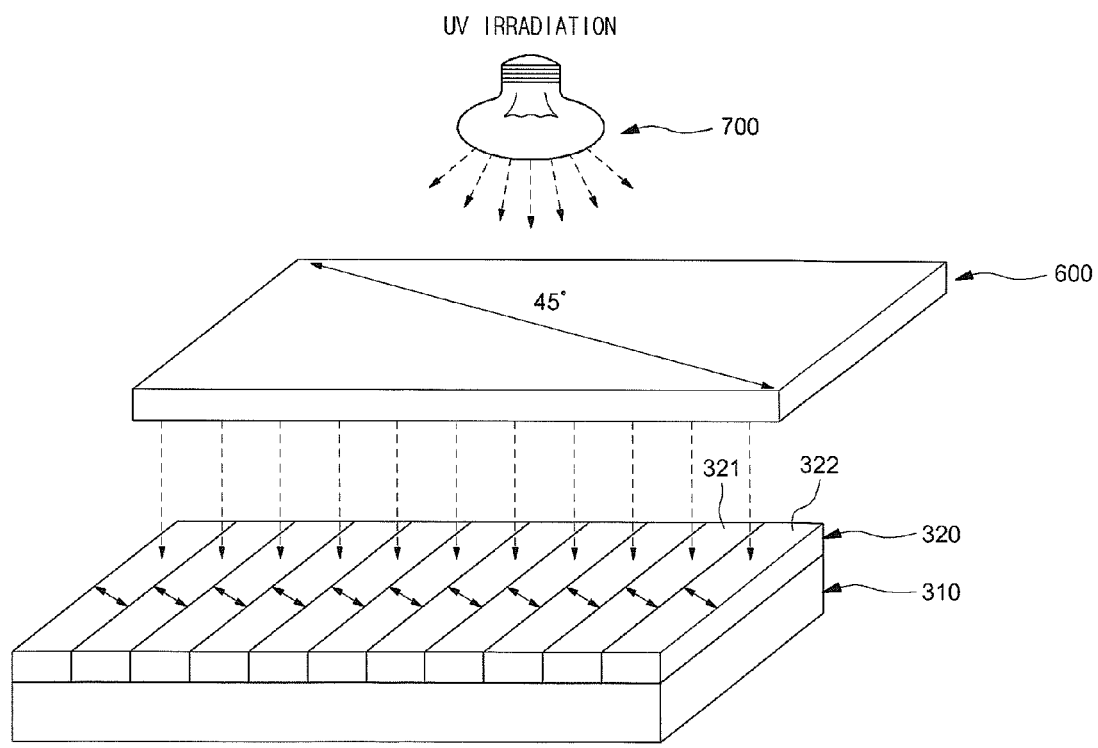
FIG. 16 is a perspective view illustrating an alignment material of a polarization converting device being aligned to a reference direction according to a third exemplary embodiment of the present disclosure.
Figure 17:
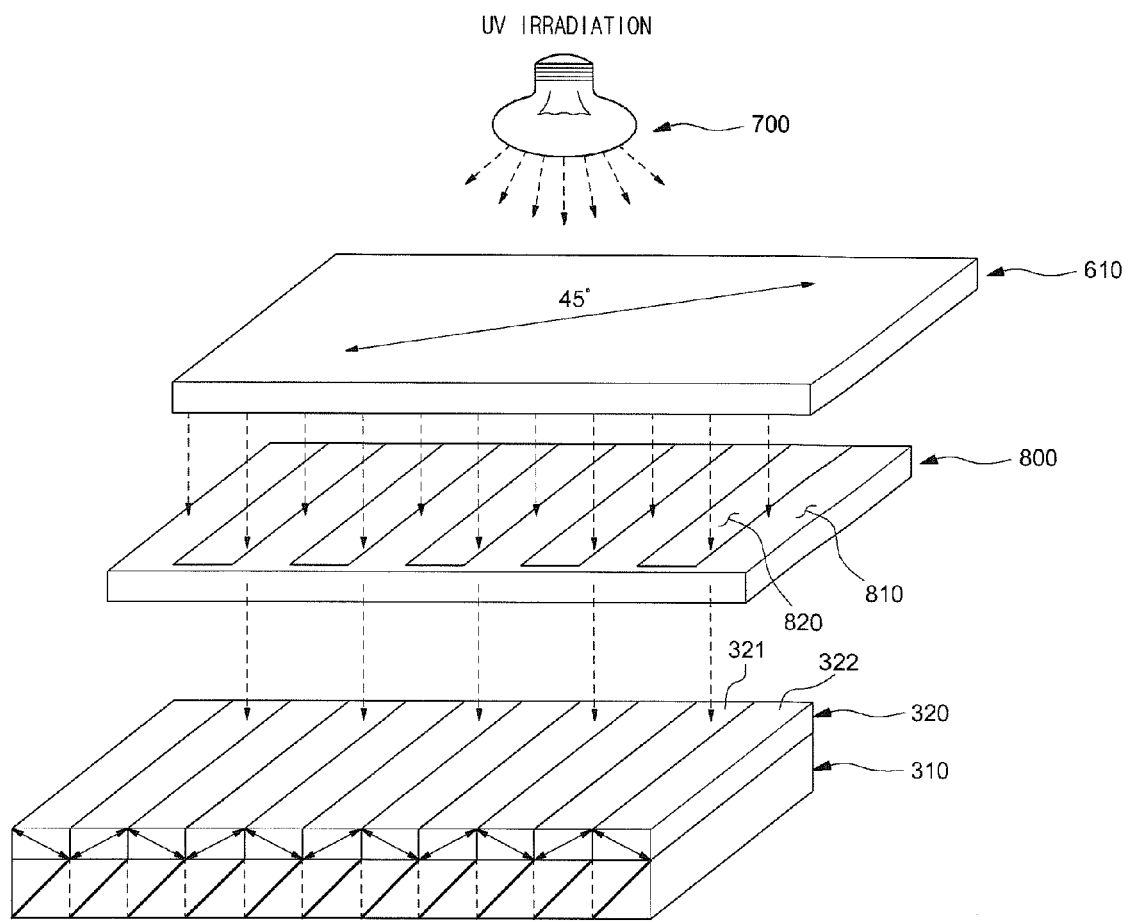
FIG. 17 is a perspective view illustrating a partially aligning processing of an alignment material of a polarization converting device at 45 degrees according to a third exemplary embodiment of the present disclosure.
Figure 18:
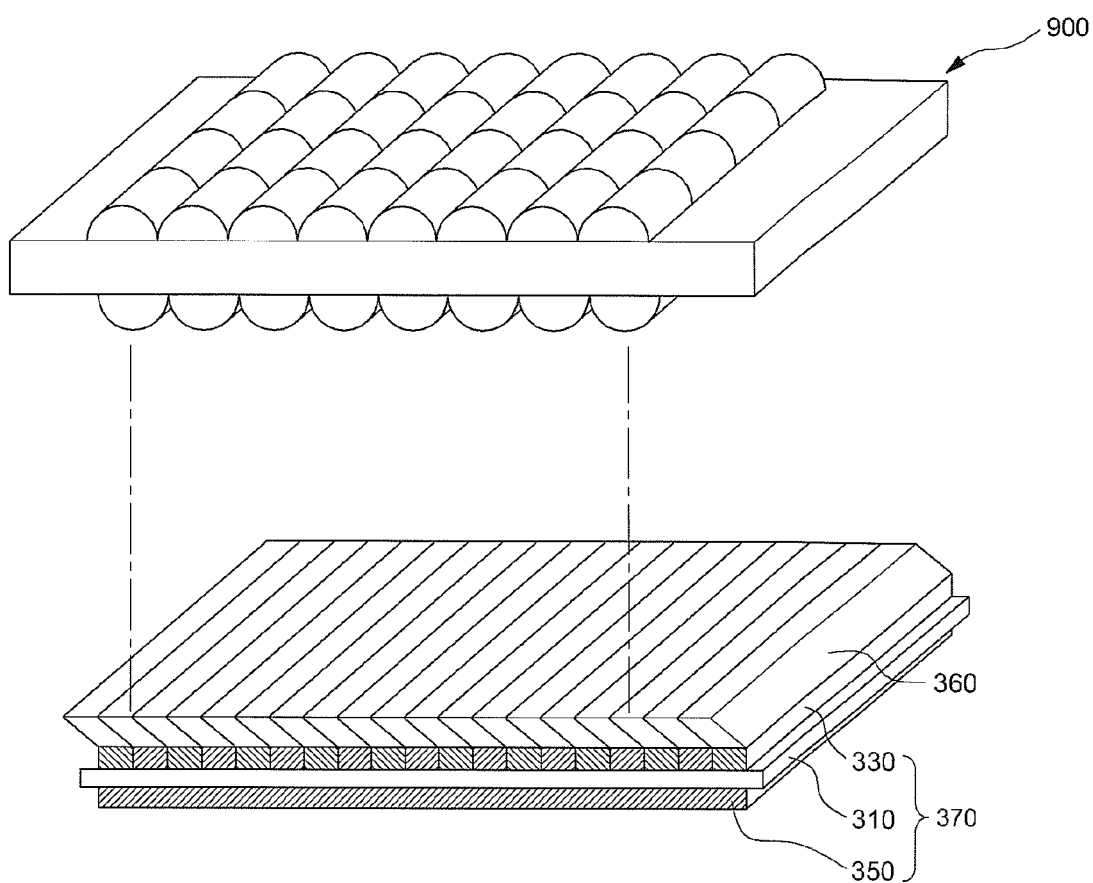
FIG. 18 is a coupled perspective view illustrating a fly eye lens being attached to a polarization converting device according to a third exemplary embodiment of the present disclosure.

FIG. 16 is a perspective view illustrating an alignment material of a polarization converting device being aligned to a reference direction according to a third exemplary embodiment of the present disclosure, FIG. 17 is a perspective view illustrating a partially aligning processing of an alignment material of a polarization converting device at 45 degrees according to a third exemplary embodiment of the present disclosure, and FIG. 18 is a coupled perspective view illustrating a fly eye lens being attached to a polarization converting device according to a third exemplary embodiment of the present disclosure.

Now, a method for manufacturing a polarization converting device according to the third exemplary embodiment of the present disclosure will be described with reference to FIG. 16.

First, the substrate 310 is uniformly coated with optical alignment film 320. The substrate 310 may be a glass substrate or a base film, and the material comprising the optical alignment film may be an organic material of polyimide group.

Successively, UV is irradiated on the optical alignment film 320 through the first UV polarization plate 600, where, as the first UV polarization plate 600 allows only the 45 degree-inclined polarization to pass, the optical alignment film 320 is slantingly aligned at 45 degrees to the reference direction. At this time, the reference direction defines a direction horizontal with or vertical to the polarization direction of light to be incident, and is conventionally set up as a direction horizontal with or vertical to the lengthwise direction of the optical alignment film 320.

Successively, as shown in FIG. 17, a second UV polarization plate 610 is prepared and inserted by a mask 800 patterned underneath the second UV polarization plate 610 to which UV is irradiated using a UV lamp 700.

At this time, the second UV polarization plate 610 is so configured as to allow only the polarization vertically inclined to the polarization direction of the first UV polarization plate 600 to pass. The mask 800 is alternately formed with a transmissive region 820 and a non-transmissive region 810, such that the optical alignment film 321 corresponding to the transmissive region 820 of the mask 800 is slantingly formed at 90 degrees relative to the alignment direction of the optical alignment film 322 corresponding to the non-transmissive region 810 of the mask 800.

Each width of the transmissive region 820 and the non-transmissive region 810 may be formed at a fine interval of 0.3~0.7 mm, such that each width of the transmissive region 820 and the non-transmissive region 810 is the same as that of unit block of the PBS array 360.

For example, as illustrated in FIG. 15, in a case the width of the unit block 361 of the PBS array 360 is 0.5 mm, each width of the transmissive region 820 and the non-transmissive region 810 at the mask 800 is also patterned with the same 0.5 mm width. As a result, the alignment directions of the optical alignment films 321, 322 corresponding to each unit block 361, 362 of the PBS array 360 come to vary.

Through the processes thus explained, the optical alignment film 320 is alternately formed with a first alignment area 322 slantingly aligned at 45 degrees relative to the optical alignment direction, and a second alignment area 321 having an optical axis vertically inclined relative to the optical axis of the first alignment area 321, and the alternately formed areas precisely correspond to the unit blocks of the PBS array 360.

However, the alignment method of the optical alignment film 320 is not limited thereto. For example, only a predetermined area may be aligned at +45 degrees by the mask pattern, while another area may be aligned at −45 degrees by the mask pattern.

Referring to FIG. 18, in a case the optical alignment film 320 is coated with reactive liquid crystal 330, the reactive liquid crystal 330 comes to be formed with an optical axis along the alignment direction of the optical alignment film 320, where, in a case the reactive liquid crystal 330 is cured, the first quarter wave converting layer 330 may be precisely aligned with the PBS array 360.

Although not shown in the drawings, the other side of the substrate 310 is entirely coated with the alignment material in the same method as above, aligned at 45 degrees relative to the reference direction, and the reactive liquid crystal is coated thereon to form the second quarter wave converting layer 350.

The process thus explained is the same as the forming process of the first quarter wave converting layer 330, such that no detailed explanation will be provided thereto.

At this time, each of the first quarter wave converting layer 330 and the second quarter wave converting layer 350 may be formed with a predetermined same thickness of approximately 1~20 μm that converts the polarized light by λ/4.

Thereafter, the first quarter wave converting layer 330 is aligned on and attached to the unit block of the PBS array 360. At this time, the fly eye lenses 900 may be stacked on an opposite surface of the PBS array 360 formed with the phase retardant layer 230 to allow the non-polarized light to be collected at the PBS array 360.

Figure 19:
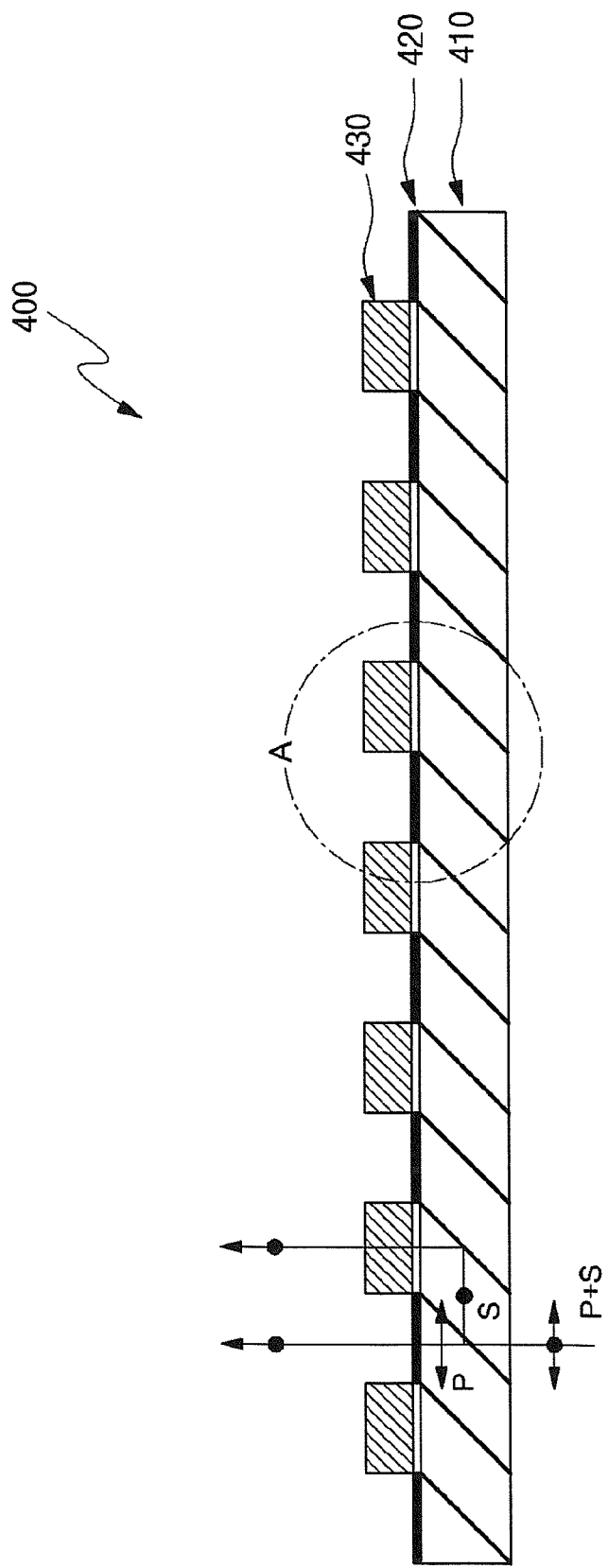
FIG. 19 is a cross-sectional view of a polarization converting device according to a fourth exemplary embodiment of the present disclosure.
Figure 20:
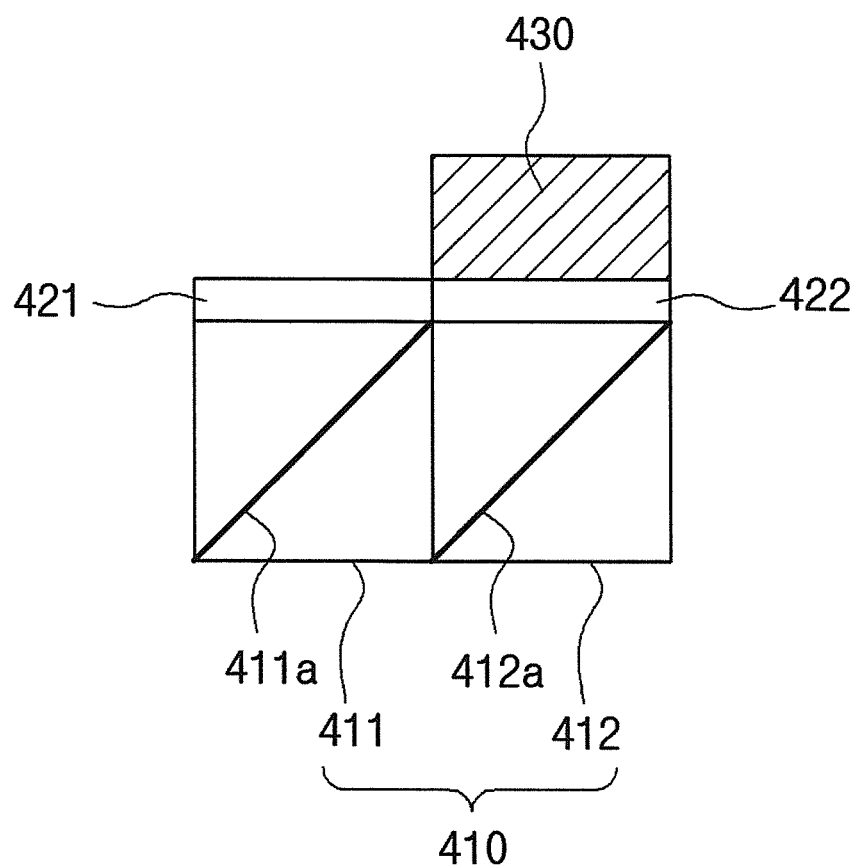
FIG. 20 is a partially enlarged view of FIG. 19.
Figure 21:
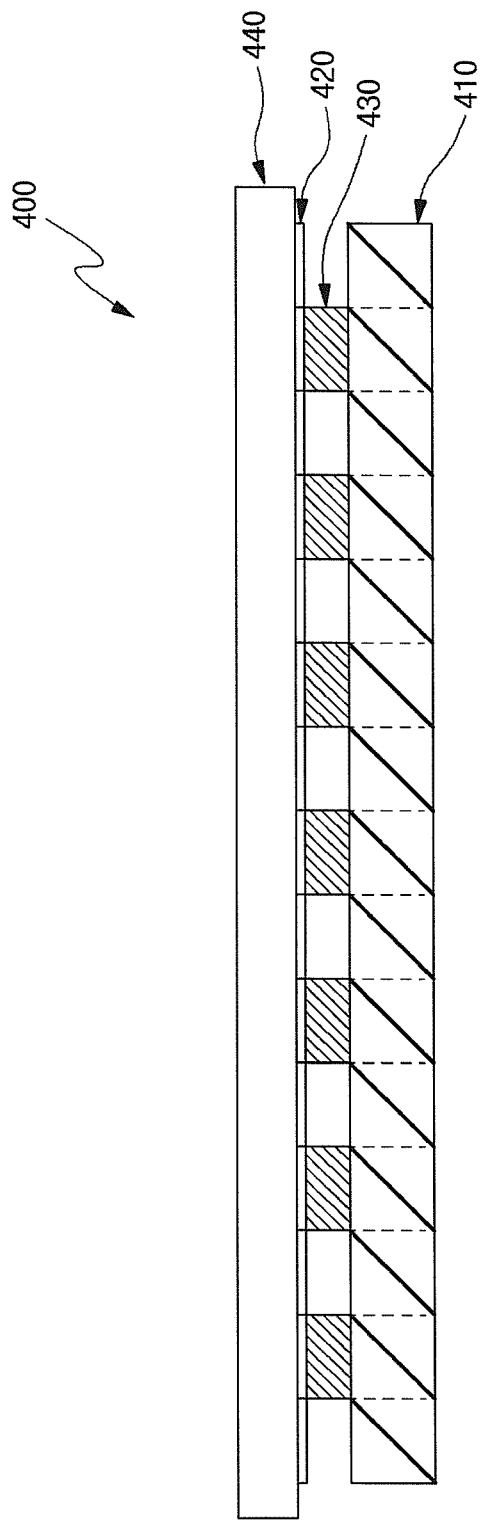
FIG. 21 is a cross-sectional view of a polarization converting device according to a fifth exemplary embodiment of the present disclosure.

FIG. 19 is a cross-sectional view of a polarization converting device according to a fourth exemplary embodiment of the present disclosure, FIG. 20 is a partially enlarged view of FIG. 19, and FIG. 21 is a cross-sectional view of a polarization converting device according to a fifth exemplary embodiment of the present disclosure.

A polarization converting device 400 according to the fourth exemplary embodiment of the present disclosure may include a polarization separation unit 410 alternately arranged with a first unit block 411 and a second unit block 412 each including an optical separator 411a, 412a transmitting a first polarization and reflecting a second polarization, and a half-wave phase retarder 430 aligned in correspondence to the unit block of the polarization separation unit 410.

The polarization separation unit 410 is a conceptual element in which light is separated responsive to a polarization direction, whereby non-polarized light is incident and emitted as a polarized light.

The polarization separation unit 410 may be configured with a PBS (Polarizing Beam Splitter) array 410 continuously formed with a PBS surface having a predetermined pitch bisecting light between an upper plate and a lower plate along the polarization direction.

The PBS surface (hereinafter referred to as 'optical separator') is formed with a multi-layer coating consisting of one or more materials, and a first polarization is transmitted but a second polarization is reflected from the PBS surface, in a case non-polarized light is incident, where the first polarization is defined as a P wave existing on a plain surface formed by a vertical vector on a surface on which light is incident and a light-progressing vector, and the second polarization is defined as an S wave perpendicular to the P wave.

The optical separators 411, 412 is inclined 45 degrees to the optical polarization direction, and the optical separator having a diagonal pitch may be considered as a unit block.

Now, for the convenience sake, the unit block of the PBS array 410 may be explained as a concept including an optical separator between an upper substrate and a lower substrate. Reference numerals for the upper substrate and the lower substrate are omitted for explanatory convenience.

In a case non-polarized light is incident on a first unit block 411, a first optical separator 411a transmits and emits the P wave but reflects the S wave. The reflected S wave is refracted at 90 degrees relative to an incident direction, because the first optical separator 411a is slantingly formed at 45 degrees relative to the optical incident direction to be incident on the second optical separator 412a of the second unit block 412, and refracted again at 90 degrees upwards by the second optical separator 412a of the second unit block 412 to be emitted to the outside.

That is, the P wave of the non-polarized light is forthright emitted from the first unit block, while the S wave is emitted from the second unit block 412 by refraction, whereby the light is bisected responsive to the polarization direction. Therefore, the PBS array 410 is alternately formed with the first and second unit blocks 411, 412 to bisect the light in response to the polarization direction.

At this time, the half-wave phase retarder 430 retards by λ/2 the phase of the light emitted from the PBS array 410 to convert the P wave to S wave or convert the S wave to P wave. The half-wave phase retarder 430 is formed with reactive mesogens, and is formed on an upper surface of the PBS array 410 at a predetermined interval.

To be more specific, the half-wave phase retarder is formed only on any one unit block of the first unit block 411 or the second unit block 412.

Referring to FIG. 21, the P wave among the non-polarized light that is incident on the first unit block 411 transmits or passes without passing through the half-wave phase retarder 430, while the S wave emitted upwards of the second unit block 412 passes the half-wave to be delayed in phase and converted to and outputted as the P wave. Resultantly, all the light passing through the polarization converting device is converted and emitted as P wave.

Conversely, although not shown in the drawing, in a case the half-wave phase retarder 430 is formed at the first unit block 411 of the PBS array 410, all the light passing through the polarization converting device may be emitted as S wave.

An alignment material 420 is formed underneath the half-wave phase retarder 430, which may be aligned at a predetermined angle by rubbing or optical alignment, and function to form a predetermined optical axis for the half-wave phase retarder 430. In a case the reactive liquid crystal is coated on the alignment material 420, an optical axis is formed responsive to the alignment direction of the alignment material 420, such that the optical axis of the half-wave phase retarder 430 is slanted at 45 degrees relative to the optical polarization direction.

FIG. 21 is a cross-sectional view of a polarization converting device according to a fifth exemplary embodiment of the present disclosure.

In a polarization converting device according to the fifth exemplary embodiment of the present disclosure, a half-wave phase retarder 430 is formed on a substrate 440 such as a glass and a base film, which is then attached to a PBS array 410. Thereafter, the half-wave phase retarder 430 thus formed is selectively attached to the PBS array 410 responsive to light to be emitted. Hereinafter, detailed description of the same constituent elements will be omitted to avoid redundant explanation.

Figure 22:
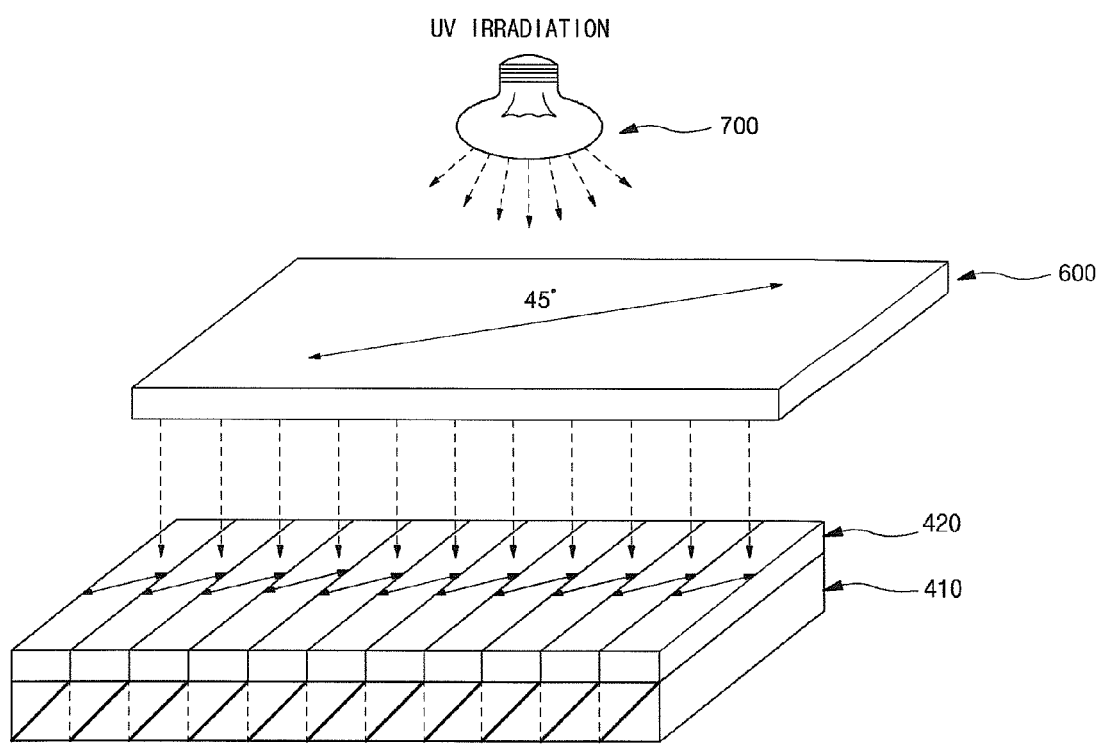
FIG. 22 is a perspective view illustrating an alignment material of a polarization converting device being aligned to a reference direction according to a fourth exemplary embodiment of the present disclosure.
Figure 23:
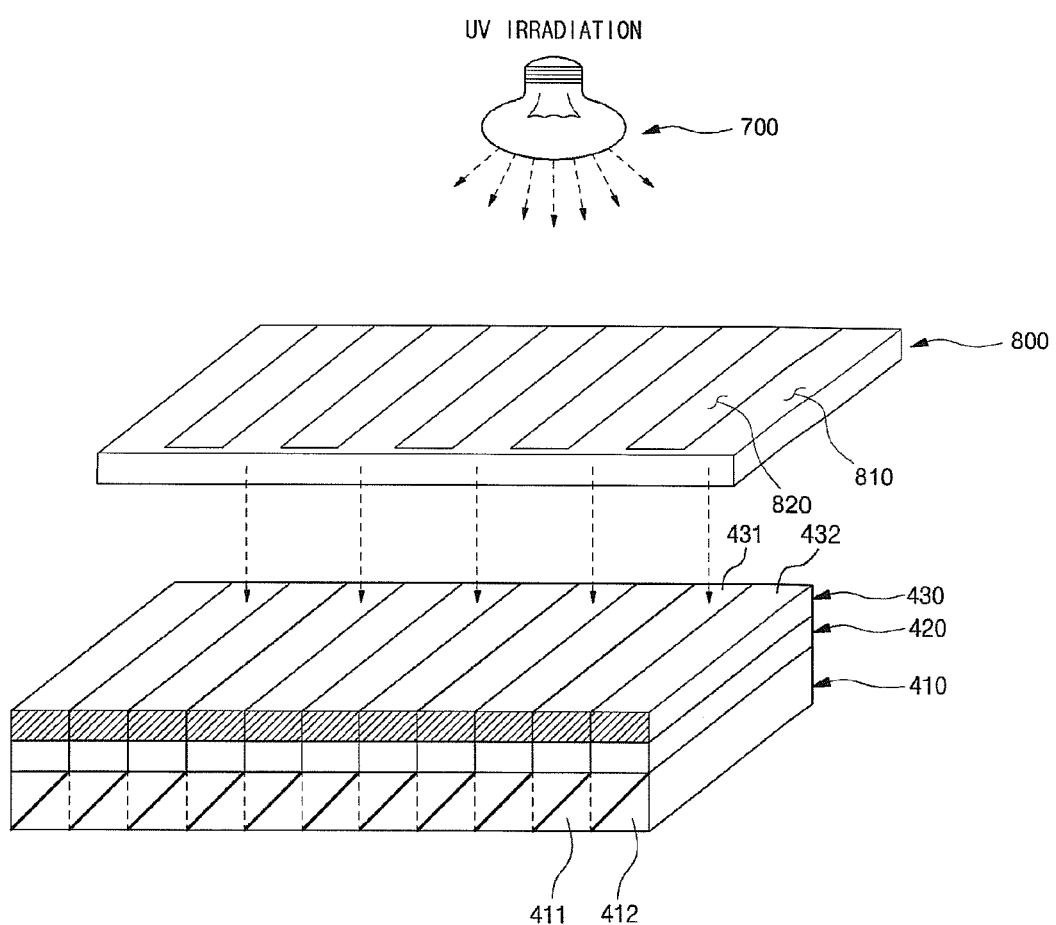
FIG. 23 is a perspective view illustrating a partially aligning processing of an alignment material of a polarization converting device at 45 degrees according to a fourth exemplary embodiment of the present disclosure.
Figure 24:
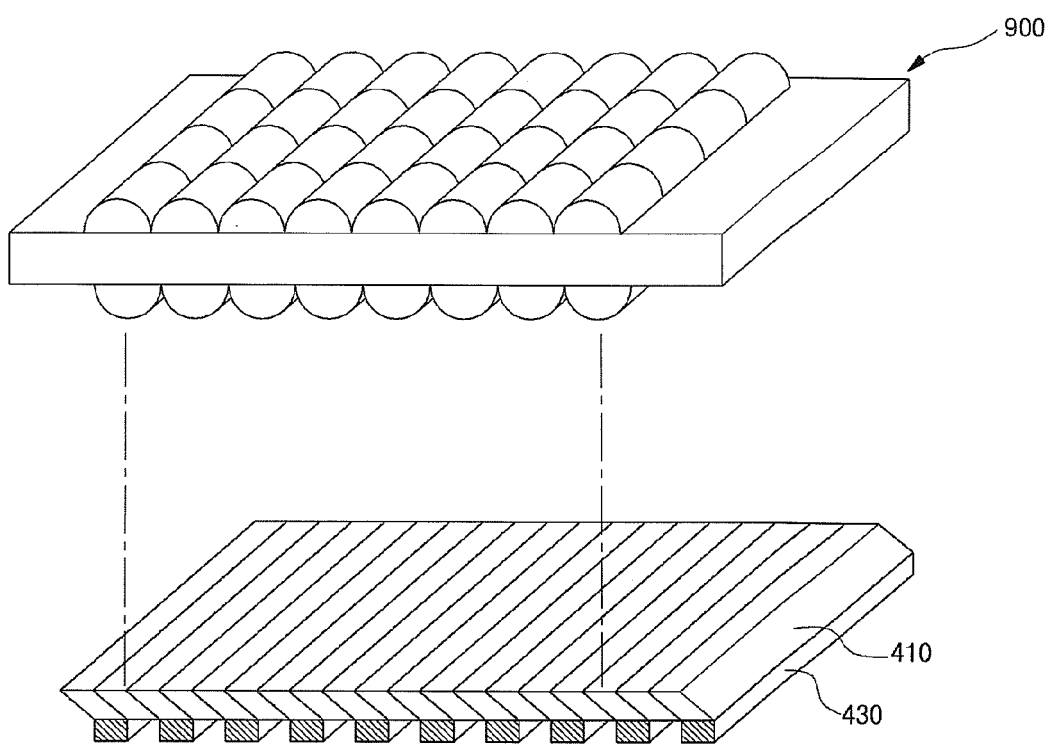
FIG. 24 is a coupled perspective view illustrating a fly eye lens being attached to a polarization converting device according to a fourth exemplary embodiment of the present disclosure.
Figure 25:
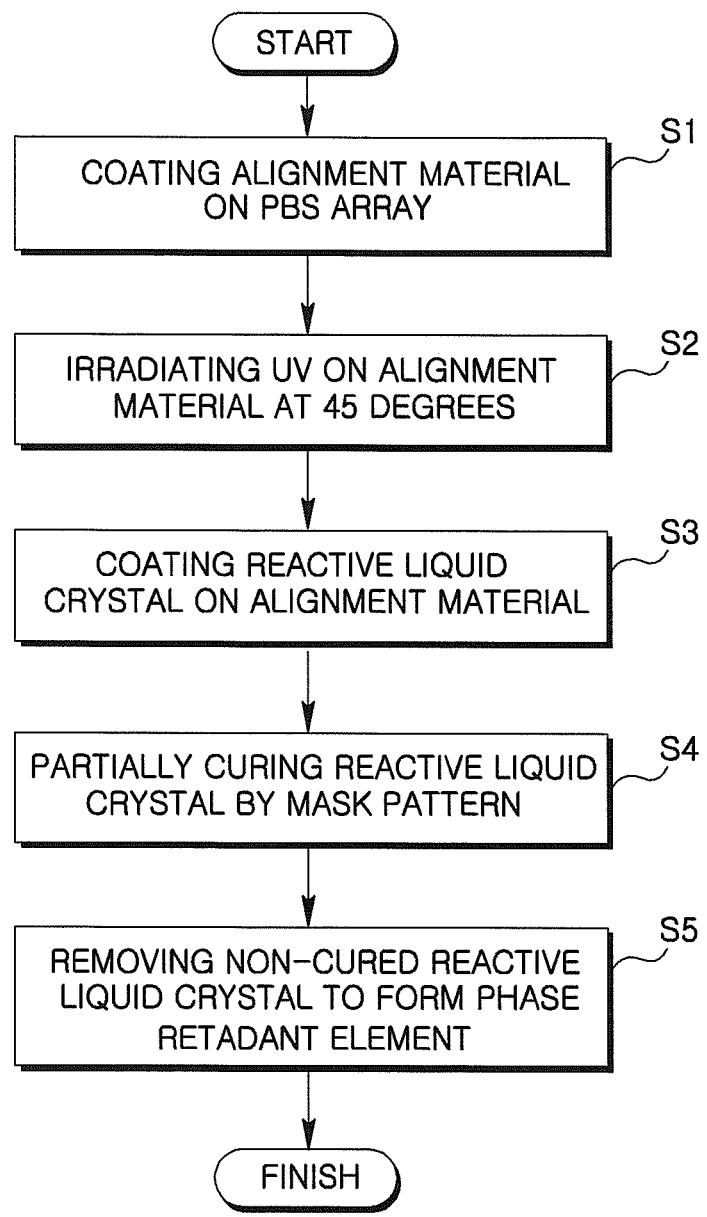
FIG. 25 is a flowchart of a polarization converting device according to a fourth exemplary embodiment of the present disclosure.

FIG. 22 is a perspective view illustrating an alignment material of a polarization converting device being aligned to a reference direction according to a fourth exemplary embodiment of the present disclosure, FIG. 23 is a perspective view illustrating a partially aligning processing of an alignment material of a polarization converting device at 45 degrees according to a fourth exemplary embodiment of the present disclosure, FIG. 24 is a coupled perspective view illustrating a fly eye lens being attached to a polarization converting device according to a fourth exemplary embodiment of the present disclosure, and FIG. 25 is a flowchart of a polarization converting device according to a fourth exemplary embodiment of the present disclosure.

First of all, referring to FIG. 22, and with reference to a method for manufacturing a polarization converting device according to the fourth exemplary embodiment of the present disclosure, a PBS array 410 is prepared in which a plurality of unit blocks including an optical separator bisecting light according to polarization (S1).

The PBS array 410 is uniformly coated with the alignment material 420 on which a UV polarization plate 600 inclined at 45 degrees relative to the reference direction is placed, and UV light is irradiated thereon. Then, the alignment material 420 is slantingly aligned at 45 degrees relative to the reference direction (S2).

At this time, the reference direction defines a direction horizontal with or vertical to the polarization direction of light to be incident, or a direction horizontal with or vertical to the lengthwise direction of the UV Polarization plate 600.

However, the aligning method of alignment material is not limited to the aforementioned method. For example, it is possible by rubbing.

Thereafter, as illustrated in FIG. 23, in a case the alignment material 420 is coated with reactive liquid crystal 430 in the thickness of 20~50 µm, the reactive liquid crystal 430 comes to be formed with an optical axis along the alignment direction of the alignment material 420 (S3).

Successively, remnant portions are deleted in order to align the reactive liquid crystal 430 only on the first unit block 411 or the second unit block 412 of the PBS array 410.

To be more specific, the mask 800 is inserted to selectively cure the reactive liquid crystal 430, where the mask 800 is alternately formed with the transmissive region 820 and the non-transmissive region 810, and the width of the transmissive region 820 and the non-transmissive region 810 is formed at a fine interval of 0.3~0.7 mm, which is the same as the width of the unit block 411 of the PBS array 410.

For example, in a case the width of the unit block 411 of the PBS array 410 is 0.5 mm, each width of the transmissive region 820 and the non-transmissive region 810 is also patterned with the same width as 0.5 mm. Therefore, the reactive liquid crystal 430 is alternately formed with a cured region 431 and a non-cured region 432 based on pattern (S4), where the non-cured region 432 is removed using chemicals or washing to form the phase retarder 430 on the PBS array 410 (S5).

However, the method of selectively removing the reactive liquid crystal 430 is not limited thereto. For example, the reactive liquid crystal 430 may be entirely cured and a predetermined section is removed using laser so as to be corresponding to the PBS array 410. At this time, an opposite surface where the half-wave phase retarder 430 is formed on the PBS array 410 may be stacked with fly eye lenses 900 to allow the non-polarized light to be collected on the PBS array 410.

The method for manufacturing the polarization converting device according to the fifth exemplary embodiment of the present disclosure is such that the alignment material 420 is initially coated on the substrate 440 and slantingly aligned at 45 degrees relative to the reference direction.

Successively, the reactive liquid crystal 430 may be coated and partially removed to correspond to the unit block to form the half-wave phase retarder 430, which is selectively attached to the PBS array 410 to allow a desired polarization to be emitted. The description of method for forming an optical axis of the reactive liquid crystal 430 and partially removing method is the same as that of the fourth exemplary embodiment, such that detailed explanation thereto is omitted herein.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A polarization converting device comprising:
a polarization separation unit aligned with a plurality of unit blocks including an optical separator between an upper surface and a lower surface of the unit blocks transmitting a first polarization and reflecting a second polarization;
a phase retarder aligned in correspondence to the upper surface of each unit block of the polarization separation unit where a first region and a second region are alternately formed; and
an optical alignment film interposed between the polarization separation unit and the phase retarder;
wherein the optical alignment film is alternately formed with a first area having a vertical or horizontal angle relative to an optical polarization direction responsive to a predetermined interval, and a second area having an alignment angle 45 degrees relative to the optical polarization direction,
wherein the first area is formed with a transmissive region by irradiating ultraviolet (UV) on the optical alignment film, and the second area is formed with a non-transmissive region by irradiating UV on the first area aligned along a mask pattern,
wherein any one of the first and second regions of the phase retarder converts the polarized light while the other region emits the polarized light as it is, and
wherein the first region and the second region of the phase retarder are formed with a cured reactive liquid crystal which is coated on the optical alignment film and has an optical axis responsive to an alignment direction of the optical alignment film,
wherein each thickness of the first region and the second region of the phase retarder is 20~50 µm.

2. The device of claim 1, wherein the first region is formed with an optical axis horizontal with or vertical to the first polarization while the second region is formed with an optical axis inclined at 45 degrees relative to the first region.

3. The device of claim 1, wherein the first region and the second region of the phase retarder have the same refractive index.

4. The device of claim 1, wherein each thickness of the first region and the second region of the phase retarder is same.

5. The device of claim 1, comprising fly eye lenses for collecting light incident on a front end of the polarization separation unit.

6. The device of claim 1, further comprising a substrate formed at an upper surface of the phase retarder.

7. A method for manufacturing a polarization converting device, comprising:
- preparing a polarization separation unit aligned with a plurality of unit blocks including an optical separator bisecting light responsive to polarization direction;
- coating an optical alignment film on the polarization separation unit;
- irradiating ultraviolet (UV) light on the optical alignment film aligned to the reference direction along a mask pattern alternately formed with a transmissive region and a non-transmissive region to partially have a reference direction and an inclination angle; and
- coating and curing a reactive liquid crystal on the optical alignment film to alternately form a first region corresponding to the transmissive region and a second region corresponding to the non-transmissive region,
- wherein each thickness of the first region and the second region is 20~50 μm.

* * * * *